US008615812B2

(12) United States Patent
Wójtowicz et al.

(10) Patent No.: US 8,615,812 B2
(45) Date of Patent: Dec. 31, 2013

(54) HIGH-STRENGTH POROUS CARBON AND ITS MULTIFUNCTIONAL APPLICATIONS

(75) Inventors: Marek A. Wójtowicz, East Hartford, CT (US); Eric P. Rubenstein, Longmeadow, MA (US); Michael A. Serio, Sturbridge, MA (US); Joseph E. Cosgrove, Columbia, CT (US)

(73) Assignee: Advanced Fuel Research, Inc., East Hartford, CT (US)

( * ) Notice: Subject to any disclaimer, the term of this patent is extended or adjusted under 35 U.S.C. 154(b) by 660 days.

(21) Appl. No.: 12/798,218

(22) Filed: Mar. 31, 2010

(65) Prior Publication Data

US 2011/0167530 A1    Jul. 14, 2011

Related U.S. Application Data

(60) Provisional application No. 61/211,503, filed on Mar. 31, 2009.

(51) Int. Cl.
*C01B 31/02* (2006.01)
*F41H 1/02* (2006.01)

(52) U.S. Cl.
USPC ...... 2/2.5; 296/187.02; 296/187.07; 502/416; 502/419

(58) Field of Classification Search
USPC .............. 96/108; 95/90, 901, 903; 2/2.5, 455; 423/445 R; 296/187.02, 187.07; 361/500; 502/416, 418, 419, 439
See application file for complete search history.

(56) References Cited

U.S. PATENT DOCUMENTS

| 3,647,551 | A | * | 3/1972 | Reed, Jr. et al. ............ 252/182.1 |
| 5,292,707 | A | * | 3/1994 | Aparicio et al. ............... 502/418 |
| 6,626,981 | B2 | * | 9/2003 | Wojtowicz et al. ............... 95/90 |
| 6,743,278 | B1 | * | 6/2004 | Carruthers ....................... 95/133 |
| 7,963,204 | B2 | * | 6/2011 | Venton-Walters et al. .. 89/36.02 |
| 8,002,880 | B2 | * | 8/2011 | Carruthers ....................... 96/108 |
| 2002/0172866 | A1 | * | 11/2002 | Yamahira et al. .......... 429/231.8 |
| 2008/0302246 | A1 | * | 12/2008 | Carruthers et al. ............. 96/154 |
| 2011/0131694 | A1 | * | 6/2011 | Fearon ................................ 2/2.5 |

* cited by examiner

*Primary Examiner* — Frank Lawrence, Jr.
(74) *Attorney, Agent, or Firm* — Ira S. Dorman

(57) ABSTRACT

High-strength porous carbon and a method of its manufacture are described for multifunctional applications, such as ballistic protection, structural components, ultracapacitor electrodes, gas storage, and radiation shielding. The carbon is produced from a polymer precursor via carbonization, and optionally by surface activation and post-treatment.

25 Claims, 10 Drawing Sheets

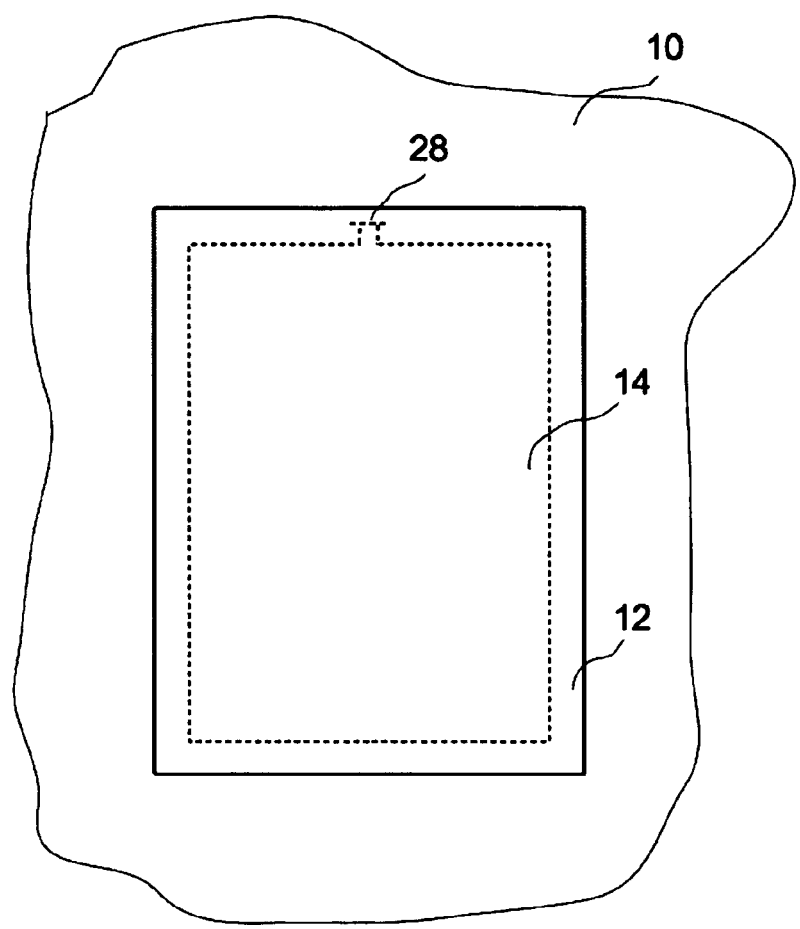
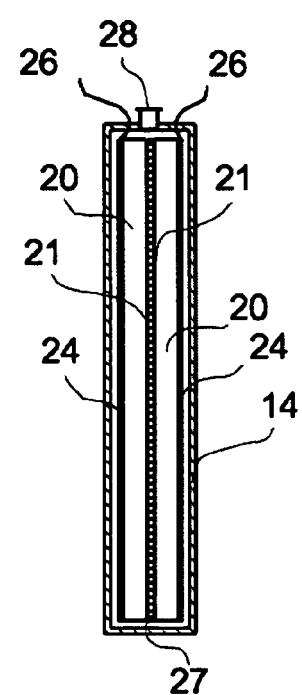
Fig. 9a
Fig. 9b

HIGH-STRENGTH POROUS CARBON AND ITS MULTIFUNCTIONAL APPLICATIONS

CROSS-REFERENCE TO RELATED PROVISIONAL APPLICATION

This application claims the benefit of U.S. provisional application No. 61/211,503, bearing the foregoing title and filed on Mar. 31, 2009, the entire specification of which is incorporated hereinto by reference thereto.

STATEMENT REGARDING GOVERNMENT INTEREST

The United States Government has rights in this invention under the following contracts: National Aeronautics and Space Administration contracts No. NAS9-19470, NAS9-97012, NNL06AA47P, NAS1-03030, NNL05AA91P, NNL06AA08C, U.S. Department of Energy grant No. DE-FG02-01ER83137, and National Science Foundation award No. HP-0638001.

BACKGROUND OF THE INVENTION

In many engineering applications, it is desirable to employ porous carbon in the form of solid monoliths (discs, plates, shaped conformal elements, hemispherical components, carbon honeycombs, etc.) rather than granular material. The advantages of the monolithic configurations over granular carbon are listed below.

- higher packing density
- higher mechanical strength
- lower pressure drop for a gas or liquid flow through channels (e.g., in a honeycomb element) versus through a packed bed of granular material
- higher thermal conductivity
- higher electric conductivity
- lower propensity to generate fine particles as a result of attrition
- ease of carbon sorbent regeneration, e.g., by resistive heating (applying voltage to the ends of carbon monolith)

Disadvantages of carbon monoliths with respect to granular carbon include: (1) a more complex carbon manufacturing process, often associated with a higher cost (e.g., the need to predict monolith shrinkage during carbonization and activation, the need to control monolith fracturing and warpage); and (2) more difficult control over the development of carbon porosity in the process of carbon activation.

The advantages of monolithic porous carbon over non-porous carbon, such as graphite or carbon fibers, are the better developed internal surface area and porosity, sorptive properties, and lower density. The disadvantages are the lower mechanical strength and the generally lower electrical and thermal conductivity. The latter two properties, however, may actually be desirable, depending on application, e.g., where materials with insulating rather than conducting properties are needed.

Examples of applications in which the use of monolithic porous carbon is, or may be, desirable are:

1. electrodes for electrochemical ultracapacitors, e.g., for use in hybrid vehicles, spacecraft and military systems (e.g., submarines, electromagnetic rail guns), and consumer electronics (cellular phones, etc.);
2. radiation shielding for spacecraft and high-altitude flights;
3. high-strength structural or surface components of spacecraft and military vehicles;
4. porous carbon plates, or differently shaped elements, for ballistic, thermal or micrometeorite orbital debris (MMOD) protection, e.g., for soldier armor plates (Small Arms Protective Inserts, or SAPIs), military vehicle armor, helmets, spacecraft outer-body plates or shields for ablative and MMOD protection;
5. gas-storage sorbents, e.g., for hydrogen storage for fuel cells, natural-gas or methane storage for gas-powered vehicles, safe storage and transportation of toxic gases, such as arsine, silane, phosphine, and boron trifluoride, and carbon sorbents for Radon testing;
6. carbon sorbents for the capture and containment of radioactive gases accidentally released at nuclear power plants;
7. supports for liquid or solid sorbents or catalysts, e.g., for liquid amines used to remove carbon dioxide from combustion flue gas, or from ambient air in air-revitalization systems (spacecraft, submarines, etc.).

It should be appreciated that, at least in some applications, combining two or more functions of monolithic carbon may be highly desirable, resulting in reduced weight, increased performance, and better overall efficiency of resource utilization. For example, large-size prismatic ultracapacitors with porous carbon monolith electrodes could be used for individual soldier's energy storage, in lieu or in addition to batteries, while at the same time providing ballistic protection in the form of SAPIs. A scaled-up implementation of the same idea could be used in armored vehicles' protective shields. Another example of dual-use monolithic carbon is carbon-filled conformal hydrogen storage tanks on board spacecraft that are arranged to form a shelter protecting astronauts from cosmic radiation. Yet another example of a multifunctional carbon implementation is the combination of ultracapacitor electrodes with radiation shielding, and optionally also with MMOD protection and/or ablative shielding. It will be appreciated by those skilled in the art that the above examples are provided only for the sake of illustration, and that many more multifunctional uses of carbon are possible

BRIEF DESCRIPTION OF THE DRAWINGS

FIG. 9 is a diagrammatic illustration of a protective garment assembly embodying the present invention. FIG. 9a and FIG. 9b are front view and side view, respectively.

SUMMARY OF THE INVENTION

Figure 1:
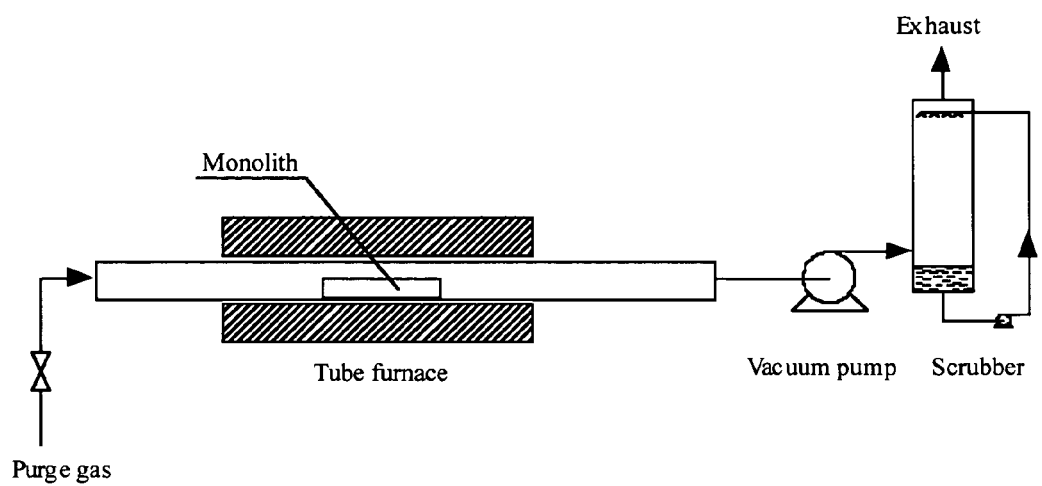
FIG. 1 is a schematic representation of a carbonization furnace operating under vacuum.

The first object of the invention is to provide a method for producing porous granular or monolithic carbon of great mechanical strength.

The second object of the invention is to provide a method for combining single-use porous carbons into multifunctional systems that possess weight, performance, compactness, efficiency, and other advantages over single-use implementations. The preferred embodiment of such porous carbons is monoliths, but the use of high-strength, attrition-resistant granular carbon is also of interest. Examples of specific applications are: (1) electrochemical-ultracapacitor electrodes; (2) radiation shielding; (3) high-strength structural or surface components; (4) ballistic protection armor; (5) micrometeorite orbital debris (MMOD) protection; (6) thermal ablative shields; (7) gas-storage sorbents; (8) radioactive gas sorbents; and (9) sorbent or catalyst supports.

DETAILED DESCRIPTION OF THE PREFERRED EMBODIMENTS

1. High-Strength Monolithic Porous Carbon

The following technology has been developed for the manufacture of high-strength porous carbon monoliths with a controlled pore structure. The preparation technique generally involves the following steps:
 1. Pressing, extruding, molding, or otherwise producing a polymer or composite precursor that has a desired shape; machining if necessary
 2. Precursor carbonization to produce a carbon monolith
 3. Monolith activation to produce an activated carbon monolith It should be noted that some polymers, notably polyvinylidene chloride (PVDC), produce high-porosity lightweight materials upon carbonization, with specific surface areas of about 1,000 $m^2/g$. It is possible that such carbons could be used in various applications without the need for activation, but the activation process may be advantageous to achieve a more desirable pore structure. A special carbon-activation technique was developed for monoliths, as described below.

1.1. Precursor

PVDC has been found to be a preferred precursor, from which high-purity, high-strength carbon with an extensive nanoscale pore structure can be produced. Phenol-formaldehyde, polyfurfuryl alcohol, and other polymers can also be used.

Polymer-based precursors are desirable as they can be easily molded, extruded, or machined to assume the desirable geometry. Extensive experience has been developed working with such materials [1, 2-5], especially with polyvinylidene chloride (PVDC) [1, 6-16]. One way of producing a polymer monolith is by placing the granular PVDC material in a die and using a hydraulic press to produce polymer discs having a density of 1.4-1.8 $g/cm^3$. In some applications, it may be desirable to use composite carbon materials to obtain carbon monoliths with custom-tailored pore structure. The PVDC carbon is entirely microporous (pore dimensions $d_p<2$ nm), and if some degree of mesoporosity (2 nm$<d_p<50$ nm) or macroporosity ($d_p>50$ nm) is desired, the PVDC can be combined with more traditional precursors (coconut shell, wood, etc.), or with mesoporous activated carbons, to form porous-carbon/PVDC-carbon composites. In the above approach, PVDC can be viewed as "porous binder" filling the interparticle voids of the granular carbon. The use of such binder greatly increases thermal and electric conductivity of the monolithic carbon as well as its mechanical strength. Carbon monoliths can be produced in the shape of honeycombs, but it will be appreciated by those skilled in the art that other monolith shapes are also possible (discs, domes, plates, etc.).

1.2. Precursor Carbonization

The monolithic elements prepared in the previous step can be carbonized (pyrolyzed) to produce highly microporous, lightweight carbon that has a density of approximately 1.22 $g/cm^3$ (in the case of PVDC) [1]. Microporosity, i.e., pores having diameters less than 2 nm, is desirable as the small pores are less likely to lead to the structural weakening of the material, as compared with meso and macroporous carbons. PVDC is well known to produce highly microporous carbons [17].

PVDC pyrolysis occurs according to reaction (1), and it takes place with the gradual hydrogen chloride (HCl) elimination and carbon formation.

$$(C_2H_2Cl_2)n \longrightarrow 2nHCl + 2nC \qquad (1)$$

The kinetics of HCl release were studied by Winslow et al. [18] and by Everett et al. [19]. They found that half of the HCl was readily lost below 200° C. by a first-order reaction with an activation energy of about 30 kcal/mol. Further liberation of HCl required progressively higher temperatures, until the process finally approached completion at about 600° C. The carbon yield was found to be 25% of the starting polymer weight, which is in agreement with more recent data [1]. The internal surface area of carbonized PVDC depends on pyrolysis conditions, and is typically in the range 1000-1300 $m^2/g$ [1, 20].

Monolith-Shape Control—

There are three main technical challenges we are addressing in the manufacture of carbonized monoliths: shape, thickness, and repeatability. By "shape" we mean the formation of monolithic structures more complex than thin discs.

Thicker monoliths are more challenging to produce because during heat-processing, exothermic reactions (1) tend to drive the system into a thermal runaway, ruining the batch, and creating a large flux of hydrogen-chloride gas. Thermal runaways are undesirable as the carbonization process has to proceed extremely slowly lest the excessive gas release should cause foaming, bubbling or monolith fracture. The following carbonization regimes were successfully used in our laboratory to process PVDC monoliths:

Carbonization Régime A:
 1. Heat at 0.7° C./min for 116 min to 100° C.
 2. Heat at 0.5° C./min for 130 min to 165° C.
 3. Hold for 30 min at 165° C.
 4. Heat at 0.1° C./min for 150 min to 180° C.
 5. Hold for 30 min at 180° C.
 6. Heat at 0.1° C./min for 200 min to 200° C.
 7. Hold for 30 min at 200° C.
 8. Heat at 0.1° C./min for 480 min to 248° C.
 9. Heat at 0.5° C./min for 600 min to 548° C.
 10. Heat at 5° C./min for 70 min to 900° C.
 11. Hold for 3 min at 900° C.
 12. Cool down to room temperature at no more than ~15° C./min.

Carbonization Régime B:
1. Heat at 0.7° C./min for 116 min to 100° C.
2. Heat at 0.25° C./min for 260 min to 165° C.
3. Hold for 100 min at 165° C.
4. Heat at 0.05° C./min for 300 min to 180° C.
5. Hold for 100 min at 180° C.
6. Heat at 0.1° C./min for 200 min to 200° C.
7. Hold for 100 min at 200° C.
8. Heat at 0.1° C./min for 480 min to 248° C.
9. Heat at 0.5° C./min for 600 min to 548° C.
10. Heat at 5° C./min for 70 min to 898° C.
11. Hold for 3 min at 898° C.
12. Cool down to room temperature at no more than ~15° C./min.

Carbonization Régime C:
4. Heat at 0.25° C./min for 300 min to 100° C.
5. Heat at 0.10° C./min for 650 min to 165° C.
6. Hold for 100 min at 165° C.
7. Heat at 0.05° C./min for 150 min to 180° C.
8. Hold for 100 min at 180° C.
9. Heat at 0.1° C./min for 200 min to 200° C.
10. Hold for 100 min at 200° C.
11. Heat at 0.06° C./min for 800 min to 248° C.
12. Heat at 0.3° C./min for 1000 min to 548° C.
13. Heat at 5° C./min for 70 min to 898° C.
14. Hold for 3 min at 898° C.
15. Cool down to room temperature at no more than ~15° C./min.

Carbonization Régime D:
1. Heat at 0.25° C./min for 300 min to 100° C.
2. Heat at 0.10° C./min for 650 min to 165° C.
3. Hold for 100 min at 165° C.
4. Heat at 0.05° C./min for 150 min to 180° C.
5. Hold for 100 min at 180° C.
6. Heat at 0.1° C./min for 200 min to 200° C.
7. Hold for 100 min at 200° C.
8. Heat at 0.06° C./min for 800 min to 248° C.
9. Heat at 0.3° C./min for 1000 min to 548° C.
10. Heat at 2° C./min for 176 min to 900° C.
11. Hold for 3 min at 900° C.
12. Cool down to room temperature at no more than ~15° C./min.

Other régimes are also possible, and the use of vacuum carbonization can lead to improved control over the process. Discs as thick as one inch can be manufactured in a reproducible manner. An example of vacuum-enhanced carbonization is shown in FIG. 1, where the outlet of a tube furnace containing a monolith is connected to a vacuum pump. In the case of PVDC, this would have to be an acid-resistant pump due to the release of large quantities of hydrochloric acid during carbonization. The pump may be located upstream or downstream of the scrubber, which may be of a wet or dry type. The system is first purged with an inert gas, e.g., nitrogen, and then carbonization is implemented under subatmospheric pressure.

A summary of selected process conditions as well as the shrinkage and weight loss resulting from PVDC carbonization are given in Table 1. It can be seen that the weight loss upon carbonization, or carbon yield, is quite constant and reproducible, and it is close to the theoretical carbon yield of ~25%. The diameter shrinkage is also quite consistent for different precursor shapes and dimensions, although there is some variation in the percent decrease in precursor thickness upon carbonization.

TABLE 1

A summary of PVDC monolith-carbonization conditions and monolith shrinkage and weight loss upon carbonization.

| | | | Before Carbonization | | | | | |
| --- | --- | --- | --- | --- | --- | --- | --- | --- |
| Shape | Flow Rate (L/min) | Temp. Profile | $m_r$ (g) | $m_i$ (g) | D (mm) | δ (mm) | V (cm$^3$) | ρ (g/cm$^3$) |
| Pellets | 0.475 | A | 135.02 | 0.55 | 11.89 | 4.36 | 0.48 | 1.14 |
| Hexagon | 1.385 | A | 28.36 | 28.36 | 34.60 | 4.40 | 13.69 | 2.07 |
| Pellets | 1.385 | A | 300.00 | 0.55 | 11.89 | 4.36 | 0.48 | 1.14 |
| Pellets | 1.385 | A | 500.00 | 0.55 | 11.89 | 4.36 | 0.48 | 1.14 |
| Disc | 1.385 | A | 129.55 | 50.98 | 60.00 | 10.00 | 28.27 | 1.80 |
| Disc | 1.385 | A | 129.55 | 50.83 | 60.00 | 10.00 | 28.27 | 1.80 |
| Hexagon | 1.385 | A | 129.55 | 27.74 | 34.60 | 5.00 | 15.55 | 1.78 |
| Disc | 1.385 | A | 147.99 | 101.06 | 60.00 | 20.00 | 56.55 | 1.79 |
| Disc | 1.385 | A | 147.99 | 46.93 | 60.00 | 10.00 | 28.27 | 1.66 |
| Disc | 1.385 | B | 102.20 | 102.20 | 60.17 | 20.80 | 59.13 | 1.73 |
| Arch | 1.385 | B | 42.81 | 42.81 | 88.27 | 20.00 | | |
| Arch | 1.385 | B | 40.72 | 40.72 | 86.73 | 21.33 | | |
| Disc | 1.385 | C | 81.98 | 81.98 | 56.11 | 18.99 | 46.96 | 1.75 |
| Disc | 1.385 | C | 150.24 | 78.18 | 56.12 | 18.78 | 46.45 | 1.68 |
| Dome | 1.385 | C | 150.24 | 72.06 | 55.94 | 19.58 | 48.12 | 1.50 |
| Dome | 1.385 | C | 145.71 | 69.13 | 55.69 | 20.36 | | |
| Disc | 1.385 | C | 145.71 | 76.58 | 56.11 | 17.77 | 43.94 | 1.74 |
| Disc | 1.385 | C | 225.37 | 79.91 | 56.10 | 18.66 | 46.11 | 1.73 |
| Disc | 1.385 | C | 225.37 | 79.53 | 56.13 | 18.23 | 45.11 | 1.76 |
| Disc | 1.385 | C | 225.37 | 65.93 | 56.07 | 15.33 | 37.85 | 1.74 |

| | Carbonized | | | | | | | | |
| --- | --- | --- | --- | --- | --- | --- | --- | --- | --- |
| Shape | $m_r$ (g) | $m_i$ (g) | D (mm) | δ (mm) | V (cm$^3$) | ρ (g/cm$^3$) | Shrinkage (diameter) (%) | Carbon (thickness) (%) | Yield$_l$ (wt %) |
| Pellets | 35.51 | 0.15 | 8.70 | 3.15 | 0.19 | 0.78 | 26.83 | 27.75 | 26.35 |
| Hexagon | 8.38 | 8.38 | 24.60 | 4.33 | 6.81 | 1.23 | 28.90 | 1.59 | 29.55 |

TABLE 1-continued

A summary of PVDC monolith-carbonization conditions and monolith shrinkage and weight loss upon carbonization.

| Pellets | 35.51 | 0.15  | 8.70  | 3.15  | 0.19  | 0.78 | 26.83 | 27.75 | 26.35 |
|---------|-------|-------|-------|-------|-------|------|-------|-------|-------|
| Pellets | 35.51 | 0.15  | 8.70  | 3.15  | 0.19  | 0.78 | 26.83 | 27.75 | 26.35 |
| Disc    | 34.12 | 13.47 | 44.33 | 8.55  | 13.20 | 1.02 | 26.12 | 14.50 | 26.42 |
| Disc    | 34.12 | 13.37 | 44.81 | 8.39  | 13.23 | 1.01 | 25.33 | 16.10 | 26.30 |
| Hexagon | 34.12 | 7.28  | 26.40 | 4.05  | 7.33  | 0.99 | 23.70 | 19.00 | 26.24 |
| Disc    | 39.75 | 27.07 | 45.94 | 16.99 | 28.15 | 0.96 | 23.43 | 15.08 | 26.79 |
| Disc    | 39.75 | 12.68 | 44.70 | 7.80  | 12.23 | 1.04 | 25.51 | 22.03 | 27.02 |
| Disc    | 27.30 | 27.30 | 45.68 | 16.75 | 27.46 | 0.99 | 24.08 | 19.44 | 26.71 |
| Arch    | 11.48 | 11.48 | 66.76 | 16.70 |       |      | 24.37 | 16.49 | 26.82 |
| Arch    | 11.01 | 11.01 | 66.81 | 16.57 |       |      | 22.97 | 22.32 | 27.04 |
| Disc    | 22.30 | 22.30 | 41.96 | 15.24 | 21.07 | 1.06 | 25.22 | 19.77 | 27.20 |
| Disc    | 39.62 | 20.54 | 45.55 | 16.78 | 27.34 | 0.75 | 18.83 | 10.65 | 26.27 |
| Dome    | 39.62 | 19.08 | 41.52 | 15.01 | 20.33 | 0.94 | 25.77 | 23.34 | 26.48 |
| Dome    | 38.55 | 18.30 | 40.99 | 15.83 |       |      | 26.40 | 22.23 | 26.47 |
| Disc    | 38.55 | 20.25 | 41.75 | 12.62 | 17.28 | 1.17 | 25.59 | 28.97 | 26.44 |
| Disc    | 60.21 | 21.20 | 41.53 | 15.07 | 20.41 | 1.04 | 25.97 | 19.22 | 26.53 |
| Disc    | 60.21 | 21.45 | 42.38 | 14.70 | 20.73 | 1.03 | 24.50 | 19.36 | 26.97 |
| Disc    | 60.21 | 17.56 | 41.78 | 12.61 | 17.28 | 1.02 | 25.48 | 17.76 | 26.63 |

Notes:
D = Disk diameter/Length of one side of hexagon
δ = Thickness of monolith
$m_t$ = Mass of Total Run
$m_i$ = Mass of Individual Pellet

1.3. Carbon-Monolith Activation

The following reactions can be used to develop extensive surface area and porosity in carbons, with the concurrent weight loss:

$$C + CO_2 \longrightarrow 2CO \quad (2)$$

$$C + H_2O \longrightarrow CO + H_2 \quad (3)$$

$$C + 1/2 O_2 \longrightarrow CO \quad (4)$$

The first two reactions are typical, whereas reaction (4) is rarely utilized due to its exothermicity and difficult control (thermal runaways).

Uniform activation of large-size monolithic elements is difficult due to the onset of mass-transfer limitations. As a result, the pores located close to the surface of the monolith tend to be enlarged (the so-called pore-mouth enlargement), whereas the pores inside the monolith get only a limited exposure to the activating agent. The resulting non-uniform pore-size distribution is undesirable in many applications, e.g., gas storage, as it degrades system or sorbent performance, it may lower thermal and electrical conductivity of the monolith, and it may also lead to the degradation of mechanical properties.

A special carbon-activation technique was developed to eliminate the mass-transfer limitations and produce microporous carbons with a uniform distribution of pore sizes. The technique is described below.

Char Activation Using an Alternating Oxygen-Chemisorption/Thermal-Desorption Process—

The technique involves alternating cycles of low-temperature chemisorption (e.g., oxygen from air at ~150° C.) and high-temperature desorption in an inert atmosphere. In this way, advantage can be taken of the rapid chemisorption kinetics on a fresh carbon surface, followed by equally fast desorption of surface oxides at high temperature (e.g., 850° C.). Both the low temperature of the chemisorption step and the inert atmosphere of the desorption step prevent excessive burn-off and the creation of larger-size pores. In each chemisorption step, this method allows for the deep penetration of the activating agent (i.e. oxygen) into the farthest and smallest pores, without the preferential burn-off of the carbon material at the pore mouth. The cyclic nature of the process, leads to superb control over pore-size distribution. Various combinations of this method with traditional char-activation procedures are possible, and this should create a powerful tool for custom-tailoring the pore structure of carbon to meet specific needs.

The above method was described in several publications [1,6-16, 21-23]. It was found that good control over pore evolution allows for the manufacture of carbon monoliths (discs, pellets, shaped elements, etc.) having a surface area of over 3,000 $m^2/g$ [1]. This char-activation technique was developed to produce highly compacted, microporous carbons for hydrogen storage, and also for producing carbon electrodes for ultracapacitors, radiation shields, and sorbent supports. Product engineering and optimization, in combination with careful selection of carbon precursor and carbonization/activation conditions should result in the desirable pore structure. A description of an experiment illustrating the above technique that was performed in a laboratory environment is given below.

Figure 2:
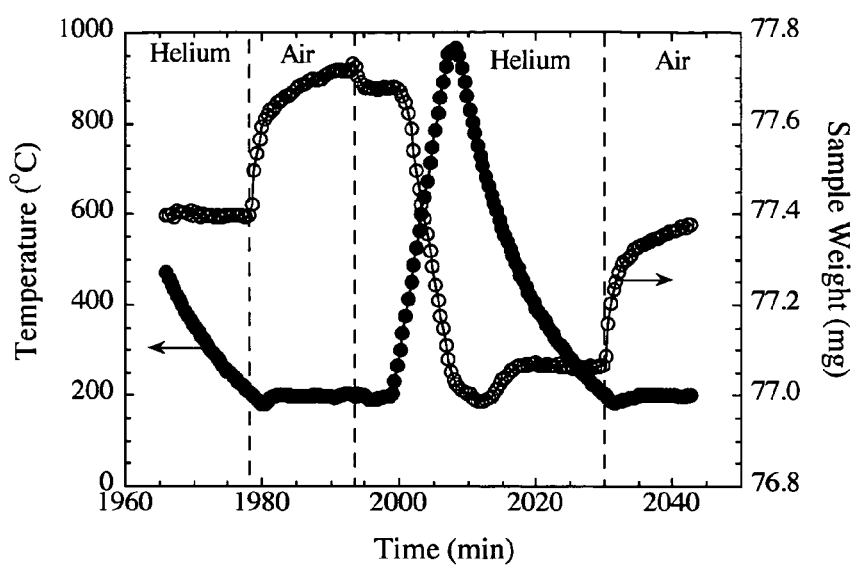
FIG. 2 is a graph showing thermogravimetric analyzer (TGA) data for a single chemisorption-desorption cycle used in a cyclic oxygen-chemisorption/thermal-desorption carbon activation technique.

Char-activation experiments were carried out in a thermogravimetric analyzer (TGA), which made it possible to follow char weight loss (burn-off) in real time. A similar packed-bed system was later constructed to produce larger quantities of carbons. The oxygen chemisorption step was performed in an atmosphere of flowing air, at 150-250° C., and the duration of this step was between 15-20 minutes. Upon completion of the chemisorption step, the inlet gas was switched from air to helium using automated solenoid valves. The system was purged, the temperature was raised to ~950° C., and the products of thermal desorption of the chemisorbed surface oxides (mainly CO) were carried out of the system. Due to the rapid desorption kinetics, it was unnecessary to hold the sample at 950° C. for more than a few minutes. The sample was then allowed to cool down to the chemisorption temperature (150-250° C.), and the inlet gas was switched from helium to air in order to initiate another cycle. A number of such cycles were performed, and data collected during a single cycle are shown in FIG. 2.

The reactions involved in the above activation scheme are:

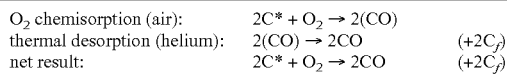

| $O_2$ chemisorption (air): | $2C^* + O_2 \rightarrow 2(CO)$ | |
|---|---|---|
| thermal desorption (helium): | $2(CO) \rightarrow 2CO$ | $(+2C_f)$ |
| net result: | $2C^* + O_2 \rightarrow 2CO$ | $(+2C_f)$ | where C* is an active carbon site, (CO) is a surface complex (reaction intermediate), and $C_f$ denotes a freshly-exposed free carbon site resulting from the desorption of the surface complex (CO).

The above-described technique makes it possible to "coat," or saturate, the char surface with the chemisorbed surface intermediates at the temperature at which the steady-state concentration of these species on the surface is high. Desorption is virtually shut down at this stage due to the low temperature, and no pore-mouth enlargement can occur. After the surface has been completely, or almost completely, saturated with surface oxides and oxygen eliminated from the gas phase (inert atmosphere), the carbon can be safely heated to elevated temperatures without the fear of particle ignition or pore enlargement (non-oxidizing conditions). The surface is stripped of the surface oxides now, including the carbon atoms, which are released as CO, and a fresh layer of carbon atoms is exposed and ready for oxidation in the subsequent chemisorption step. In this way, the carbon is activated uniformly throughout its entire pore structure cycle by cycle.

Although the above-described carbon activation method is uniquely advantageous for carbon monoliths, the use of traditional techniques, such as carbon-dioxide or steam activation is often adequate, depending on application.

1.4. Mechanical Properties of Monolithic PVDC Carbon 1.4.1. Preliminary Testing

Results of a preliminary study are shown in Table 2. It was found that the surface hardness is great enough to resist scratching from sharpened steel blades, but not silicon-carbide that is being pushed down hard against the carbon's surface.

The fabrication of several large diameter discs (~4.2 cm diameter) yielded near homogeneity in the finished product. The variation in percent shrinkage is ~1.5%, amounting to the diameters varying by less than 1 mm. This high degree of repeatability was achieved with standard machining techniques, and not high-precision computer-aided-manufacturing (CAM). The components shrink during thermal processing, but do so in a highly consistent manner.

Our assessment of material hardness has demonstrated that the only test item in our lab that is harder than the sorbent is a silicon-carbide rasp. No other device in the lab scratches the test samples, including a steel X-acto blade, a ball-mill, or even other sorbent monoliths. Indeed, the silicon-carbide rasp was only able to mar the surface when significant pressure was put upon it.

Our initial measurements of the structural strength have evaluated two types of samples: 3 mm and 16 mm thick samples. In one series of tests, we performed three-point shear tests with the samples. Forces of up to ~50 kg were applied to the 16 mm discs, with no discernable flexure, chipping, or breakage. About 12 kg forces were applied, in a three-point shear test to the 3 mm discs; again there were no deleterious effects upon the samples. The thicker discs passed the following additional tests: 100 kg compression, 50 kg tensile, and 35 kg torsion/flexure.

TABLE 2

Table of preliminary mechanical tests performed on disc monoliths.

| Sample | Test | Outcome |
|---|---|---|
| 3 mm thick discs | Grinding in ballmill for 24 hrs | samples unharmed |
| 16 mm thick discs | Self grinding (pressed together with ~15 kg force and scraped together) | samples became shiny, but were unharmed |
| 3 mm and 16 mm thick discs | Scratch test with X-acto blade | samples unharmed |
| 3 mm thick discs | Scratch test with silicon-carbide rasp, with ~2 kg force | samples slightly scratched |
| 3 mm thick discs | Scratch test with silicon-carbide rasp, with ~5 kg force | samples moderately scratched |
| 3 mm thick discs | 3-pt shear test with ~12 kg force | samples unharmed |
| 16 mm thick discs | 3-pt shear test with ~50 kg force | samples unharmed |
| 16 mm thick discs | 100 kg compression force | samples unharmed |
| 16 mm thick discs | 50 kg tensile force | samples unharmed |
| 16 mm thick discs | 35 kg torsion force | samples unharmed |

1.4.2. More Extensive Testing

General Character—

Carbon sorbent discs have the appearance of a black lightweight and brittle material. When sufficiently thin, discs may be broken by hand applying a bending moment with no noticeable deformation before failure. The pattern of failure is of irregular fracture similar to glass with little dust but also without a clean plane of cleavage.

Machining assessments were undertaken prior to mechanical properties assessment in order to maximize sample yield from raw material. General recommendation is to treat this material with the same precautions and techniques as when machining any carbon composite. A discussion of results of several tests of mechanical strength is given below.

Drilling—

Machining assessment began by attempting to drill carbon sorbent material on a drill press using a typical general purpose bit to establish machining characteristics of carbon sorbent at minimal cost. Several configurations were attempted including drill speed variations and fluid changes. Drill bit was a new ⅛" general purpose bit, typical for use on wood and metal. Carbon sorbent disc was supported in a vice atop a block of wood. Drill speeds attempted were 3100 rpm, 1700 rpm and 300 rpm. As expected, maximum penetration was achieved with the highest speed setting. However, maximum penetration was only 0.035" out of a sample 0.117" thick. Drilling operation was attempted without cutting fluid, with water as a cooling fluid and with cutting oil. None of which made a significant difference to cutting depth. Cutting oil had the additional disadvantage of contaminating the surface while water had the benefit of trapping carbon dust from the drilling operation. Drilling was attempted in two locations on the sample. Attempts at each location were terminated when the sample failed after excessive pressure was applied.

Upon consultation with several machinists and portable tool specialists, carbide drill bits were recommended. Various carbide drill bits were tested with and without Diamond Like Coatings (DLC). DLC is typically used to help mitigate heat build-up and to facilitate chip removal similar to tin-Ti coatings. Uncoated carbide drill bits have been most successful. A ⅛" non-coated carbide bit was able to make a clean hole, while a ⅛" DLC carbide bit failed to penetrate and led to sample failure. All carbide drill bit tests were conducted without aid of cutting fluid but drilling operations were periodically paused to allow for cooling. DLC bit had a further characteristic of creating excessive carbon "smoke". Carbon "smoke" is very fine dust emitted from machining, which could be trapped within user's lungs if inhaled. A dust mask was used but a vacuum or water mist should be employed to help contain dust. Non-coated carbide bits provided generally satisfactory results, except for cases with particularly thin samples. Material was often chipped out leaving a rough hole in thin samples. It was hypothesized that additional shear at drill bit contact point contributed to this phenomenon. A technique was employed to attempt to minimize this effect. First a pilot hole was drilled through, the sample was then flipped over, and a larger bit entered pilot hole in opposing direction. Bits employed for this operation were ⅛" and #8 drill bits. #8 drill bits are slightly larger than ⅛" bits and were used for reverse boring.

"Blow out" was found to be a problem in thin samples. "Blow out" is large uneven chipping of sample material around drill bit tip as it exits carbon sorbent material. One of our machinist consultants suggested a reverse bore or reduced shear technique. Reverse bore technique entails drilling a pilot hole in one direction and then drilling the final hole from the opposite direction. Reverse bore or reduced shear technique provided a cleaner entry hole but continued to display "blown out" exit holes. ⅛" drill bit did not exhibit as much chipping on exit as did #8 bit. It was found that in samples that had a thickness exceeding drill bit radius "blow out" could be minimized.

In view of the above results, it is recommended that uncoated carbide drill bits be used with a water mist and minimum sample thickness exceeding drill bit radius for carbon sorbent drilling operations. Drill bit selection by these guidelines ensures the best hole quality, and water misting ensures work place safety by suppressing carbon smoke. Water misting also provides cooling of sample and drill bit, which improves sample integrity and drill bit life.

Grinding and Sawing—

Grinding carbon sorbent material using a bench grinder was successful in both the supported and unsupported modes. Grinding of any form is the best method to use in reshaping carbon sorbent fineness of finish is directly related to grain size of grinding implement. Special precautions were taken to avoid breathing resultant carbon dust.

Sawing carbon sorbent using a band saw provided mixed results. In the case of a carbon sample that was fully supported on a piece of wood and cut with the band saw, the cut was found to be uniform, with only slight chipping apparent at the upper face of the sample. Attempts to cut unsupported carbon resulted in severe chipping of the carbon disc. Though it is possible to saw PVDC carbon, it is not a preferred method of shaping because it quickly dulls the saw blade and leaves a course finish.

When grinding or cutting high-strength carbon, it is recommended that the carbon be always supported on a backing material, e.g., wood, to maintain good finish quality. Furthermore, the use of a diamond-coated saw blade is recommended to prevent excessive chipping.

Mechanical Property Assessment—

Several ASTM standard tests were selected for carbon characterization: Compressive Properties (ASTM D 695-02a), Tensile Properties (ASTM D 3039M), and Flexural Properties (ASATM D 790-03). Results of these tests performed on carbonized, but unactivated, PVDC carbon are presented below.

Compressive Properties (ASTM D 695-02a)—

5 carbon samples were used in this test, and the sample dimensions were 1"×1"×2", with a tolerance of 0.001" (both flat and square). Results indicate a mean compressive strength of 23 ksi. The failure mechanism is fast fracture, which reduces the sample to fine powder and course grit. Five samples were tested with consistent results; two samples were equipped with biaxial strain gauges to permit the calculation of Young's modulus and Poisson's ratio.

Tensile Properties (ASTM D 3039M)—

5 carbon samples were used in this test, and the sample dimensions were 0.22"×1"×3.5", with a tolerance of 0.001" (both flat and square). Results indicate a mean tensile strength of 1.7 ksi. Failure occurred within fixturing grips, but was consistent with tensile failure of brittle materials between 5 specimens. Five samples were used with consistent results, and two samples were equipped with biaxial strain gauges to permit calculation of Young's modulus and Poisson's ratio.

Flexural Properties (ASATM D 790-03)—

5 carbon samples were used in this test, and the sample dimensions were 0.188"×1"×3.5", with a tolerance of 0.001" (both flat and square). Results indicate a mean flexural strength of 3.6 ksi. Failure was consistent between 5 specimens. Small sample dimensions posed a challenge in sample preparation, but each test was completed with 5 samples as specified by ASTM standards.

The above results are summarized in Table 3, and they show that the PVDC-derived carbon, which has the density of ⅓ of the density of concrete, is 5-10 times stronger than concrete in compression. This favorable strength-to-weight ratio suggests this carbon may be appropriate for applications in structural systems.

TABLE 3

Mechanical properties of PVDC carbon sorbent.

|  | Max Stress (psi) | Max Strain (in/in) | Young's Modulus (Msi) | Poisson's Ratio | Density (lbs/in$^3$) |
|---|---|---|---|---|---|
| Compression | 23,348 | 0.009 | 2.55 | 0.2 | 0.029 |
| Tension | 1,700 | 0.0005 | 3.4 | 0.17 | 0.029 |
| Bending | 3,645 | — | — | — | 0.029 |

Preliminary Ballistic Test Results—

Tests were performed to investigate potential multifunctional applications of PVDC carbon. An initial ballistic impact test was conducted with a 0.22 inch diameter soft lead projectile fired at a velocity of 1150 fps. Sorbent material was configured to simulate its inclusion in a layered multifunctional system. A single sorbent disc 4 inches in diameter and 1 inch thick wrapped in aluminum tape was used as a target with a fiberglass and wood backstop. Carbon sorbent was able to stop the projectile with little penetration and good energy distribution throughout sorbent material. Energy distribution was noted by examining crack patterns upon carbon face.

Results of a separate test suggest that a 12.7 mm armor piercing projectile would be stopped by the PVDC carbon disc at a range of 1.5 miles. Two 1" thick pieces of our carbon were shattered by the 12.7 mm AP projectile, but the projectile did not penetrate beyond the armor plate.

Resistance to Oxidation—

A PVDC carbon monolith has been tested to 450° F. in a 20% oxygen environment without burning, and it is fair to conclude that the fire risk of PVDC carbon is low. Spacecraft interior environments often have more than 20% oxygen environments including spacesuits which use 100% oxygen. Thus, fire risk of PVDC carbon sorbent still needs to be investigated in elevated oxygen environments. PVDC carbon by itself is stable in temperature extremes of space, permitting use of PVDC carbon for interior or exterior spacecraft applications.

Conclusions—

PVDC carbon has potential multifunctional applications in micro meteorite and orbital debris shielding and energy storage applications. Areas of particular interest include flammability in elevated oxygen environments, mechanical properties and hypervelocity impact testing results. Additional favorable mechanical properties are fracture toughness and shear strength.

2. Carbon for Ballistic/MMOD Protection Combined with Ultracapacitor Electrodes 2.1. High-Performance Carbon for Ultracapacitor Electrodes The special carbon-preparation technique, explained above, was used to produce high-density, high surface area carbon electrodes for next-generation ultracapacitors. High rate energy storage devices, such as batteries, ultracapacitors, and flywheels, are critical enabling technologies for hybrid electric vehicles (HEV). While ruthenium-based ultracapacitors exhibit almost ideal characteristics, the ruthenium was found to be too expensive for the large-scale manufacture of ultracapacitors [24]. Carbon has been identified as the most promising material for ultracapacitor electrodes [25], from the standpoint of both its performance and cost. Our PVDC-based carbon electrodes were found to achieve capacitance of the order of hundreds of Farads per gram, which greatly exceeds the currently available technology. The typical values of electrode capacitance are about 20 F/g for granulated activated carbons, 30-50 F/g for activated carbon fibers (ACF), with maximum values in the range 70-80 F/g.

The best electrode materials for use in electric double-layer capacitors (EDLC) possess three characteristics: (1) high surface area; (2) high electrical conductivity; and (3) surface area easily accessible by electrolyte. Specialty carbon materials can meet the above technical criteria at reasonably low cost, provided good control over pore-size distribution can be implemented.

Some of the materials used for carbon electrodes include carbon powder [26], activated carbon fibers [27, 28], and synthetic carbon aerogels [29]. Of these materials, carbon aerogels and fibers are among the most promising of the group for making carbon electrodes. Their major drawback, though is the low bulk density. The one drawback of all of the above methods for producing porous carbon electrodes is that a substantial amount of surface area is lost due to a large amount of voidage present in the material. While some type of network allowing the electrolyte to penetrate into the porous carbon material is important, excess voidage results in the loss of usable surface area and in the low charge-storage density. The use of a monolithic, highly porous carbon electrode would be the ideal solution.

Ultracapacitors—

Capacitors are electrical devices for storing charge in the form of electrostatic energy. The best-known form of the early capacitors is the Leyden jar, which consists of a glass vial containing an aqueous acidic electrolyte as a conductor with an electrode immersed in the liquid. The outside of the vial is covered with a metal foil, and the glass between the electrolyte and metal foil acts as the insulating material. Charge stored in the solution flows from the electrode to the metal foil on the outside of the jar when an electric circuit between the electrode and the foil is completed.

The Leyden jar and other such devices were the forerunners of the modern parallel plate capacitor. This type of capacitor consists of two parallel electrodes separated by either air or an insulating material known as a dielectric.

Another form of capacitor is the electrolytic, or electrochemical, capacitor, which has an extremely thin layer of a dielectric sandwiched between a metal plate and a conducting solution. The configuration of this type of capacitors solves three major technical problems. The first is that of maintaining two large metal plates at extremely small separation without allowing them to come into contact. Second, the greater insulating ability of the dielectric makes it possible for higher potential differences (voltages between the plates) without conduction of currents through the dielectric. Third, the capacitance (ability to store charge) is greater for the same dimensions as compared with an air capacitor.

The first use of an electrochemical capacitor, to store energy in the same manner as a battery, was first proposed and developed in the patent awarded to Becker in 1957 [30]. In Becker's device, charge is stored in the interfacial layer at a porous carbon material perfused with an aqueous electrolyte. The principle employed by this device involved the charging of the double layer, which occurs at the interface of a charged solid surface and an electrolyte solution. This phenomena, where charge is stored in the double layer, are also found on the surfaces of colloids [31], flocculants [32], semiconductors, and immiscible electrolyte solutions [33].

After Becker, Conway utilized a principle from work by Trasatti and Buzzanca [34] to develop a capacitor based upon the concept of D. Craig [24] at the Hooker Corporation. This type of capacitor was based on using the large, "pseudocapacitance" ($C_\phi$), where there is some continuous dependence of charge passage during an oxidation or reduction reaction. The system developed by Conway used an electrochemical adsorption of hydrogen or certain base metals [35] onto platinum or gold as a method for storing energy. Pseudocapacitance was again used in a method associated with solid oxide redox systems in aqueous sulfuric acid on a ruthenium oxide films [34, 36-38]. While the system exhibits almost, ideal capacitance behavior, the ruthenium was found to be too expensive for development as large-scale capacitors [24].

Ruthenium-based capacitors, along with carbon-double-layer-type capacitors have been found to store charge in the farads-per-gram range. This has led to the term "supercapacitor" or "ultracapacitor" to describe these systems' capacity to store large amounts of charge, rated on the order of tens of farads rather than in the millifarad range. The reason for the ability of carbon-based systems to achieve such high storage ratings is attributed to their extremely large surface area that can be achieved in very small volumes and at quite low weights. Features of carbon-double-layer-type capacitors which make them preferable to ruthenium-based capacitors are cost and non-toxicity.

Carbon capacitors use the same phenomena of double layer charging, but can be discharged at substantially higher rates than conventional batteries. Needless to say, this has garnered interest in these devices for a variety of applications such as hybrid power systems for electric cars, high rate, short pulse delivery of large charges (such as pulsed lasers), power-supply low-frequency smoothing, and a variety of military, medical (defibrillators), telecommunications, and computer applications. The list of new applications for ultracapacitors is expected to grow in the foreseeable future.

Ultracapacitor Electrode Performance Data
Carbon-Electrode Preparation—

Granular PVDC was used as carbon precursor, and the following carbonization régime was used:
1. Heat at 0.7 K/min for 116 min from room temperature to 100° C.
2. Heat at 0.5 K/min for 130 min to 165° C.
3. Hold for 30 min at 165° C.
4. Heat at 0.1 K/min for 150 min to 180° C.
5. Hold for 30 min at 180° C.
6. Heat at 0.1 K/min for 200 min to 200° C.
7. Hold for 30 min at 200° C.
8. Heat at 0.1 K/min for 480 min to 248° C.
9. Heat at 0.5 K/min for 600 min to 548° C.
10. Heat at 5 K/min for 70 min to 898° C.
11. Hold for 3 min at 898° C.

The PVDC polymer was carbonized in an atmosphere of flowing helium using a laboratory tube furnace. The PVDC powder was pressed into discs (pellets) prior to carbonization using a ten-ton press. The initial diameter and weight of each PVDC disc were, respectively, D=13 mm and $m_{PVDC}$=180 mg or 300 mg.

The sample weight loss during pyrolysis was found to be 74.7% for the 300 mg discs and 75.0% for the 180 mg discs. This is in agreement with the theoretical weight loss for PVDC pyrolysis.

Following pyrolysis, the carbonized sample was typically left in the tube furnace for carbon activation, as described below. If samples of PVDC carbon discs were removed from the furnace, it was done in such a way that the samples were never exposed to ambient air, or any other oxidizing atmosphere. This was accomplished by transferring the sealed furnace tube to a nitrogen-purged glove box where samples were weighed, machined to a desired disc thickness (δ=2 mm), and loaded into a sealed and nitrogen-purged cell prior to ultracapacitor testing. To study the effect of surface oxidation on ultracapacitor performance, a few samples of PVDC carbon were placed in an oxygen-purged vial overnight, which was followed by ultracapacitor testing.

Carbon activation was carried out using the same tube-furnace assembly as was used during polymer pyrolysis. Since multiple chemisorption-desorption cycles were required to reach the desired sample burn-off (weight loss), the activation procedure was fully automated to allow unattended operation.

A typical experiment was conducted as follows. Each carbon-activation run began with a thermal-desorption step. The sample was placed within the tube furnace, purged with helium, and taken on a temperature excursion to a specified desorption temperature, $T_d$, at which it was held for time $\tau_d$. The temperature was then lowered to the desired oxygen-chemisorption-temperature, $T_{ch}$. When the sample reached the chemisorption temperature, $T_{ch}$, the system purge gas was automatically switched from helium to air using a solenoid switch valve. This marked the beginning of the oxygen-chemisorption step. The chemisorption step continued for a specified time period, $\tau_{ch}$, and the gas flow was then switched from air to helium. After the system was thoroughly purged with helium, the desorption step of the second cycle began by raising the temperature to $T_d$. All the surface oxides present on the char surface due to oxygen chemisorption were released at this stage, mainly as carbon monoxide, which led to the loss in carbon weight. Carbon burn-off is associated with an increase in internal surface area of carbon as a result of formation of new pores and the enlargement of the existing ones. The above-described cycle was repeated a number of times until the desired degree of burn-off, and surface activation, was reached. Throughout the entire multi-cyclic experiment, temperature, sample weight, and the position of the solenoid valve were continuously recorded by means of a personal computer.

At specified levels of burn-off, samples were taken out of the tube furnace, weighed, and subsequently tested for specific capacitance. Again, care was taken so that the carbon would not be exposed to oxygen prior to capacitance testing.

The following control parameters were used in the carbon-activation process:

| | |
|---|---|
| $T_{ch}$ = 200° C. | (temperature of the chemisorption step: air) |
| $\tau_{ch}$ = 120 min | (hold time of the chemisorption step) |
| $\tau_{purge}$ = 18 min | (helium purge) |
| $\tau_{heating}$ = 18 min | (heating ramp) |
| $T_d$ = 800° C. | (temperature of the desorption step: helium) |
| $\tau_d$ = 12 min | (hold time of the desorption step) |
| $\tau_{cooling}$ = 150 min | (cooling from $T_d$ to $T_{ch}$) |

Ultracapacitor-Electrode Testing—

Figure 3:
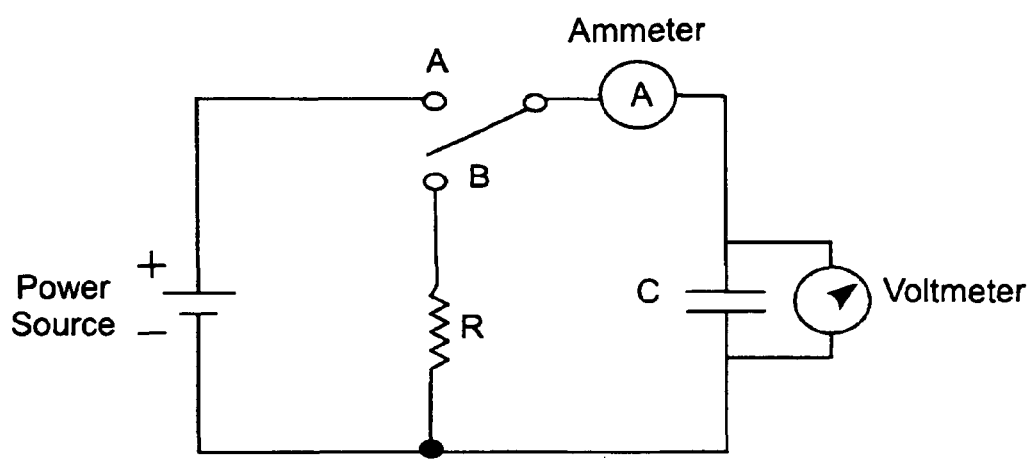
FIG. 3 is a graph showing the ultracapacitor testing circuit used for electrode testing.

A simple, but robust, circuit shown in FIG. 3 was used in conjunction with a cell capable of testing carbon-disc monoliths about 2 mm in thickness. The circuit consisted of a BK Precision model 1660 triple output DC power supply, a voltmeter, an ammeter, a resistor of known resistance (1.2Ω or 5.6Ω), and a three-way switch. The following three-step testing procedure was used, with the voltage-time profile shown in FIG. 4.

1. Charging the ultracapacitor at constant current from zero voltage to a maximum voltage $V_{max}$=0.6-0.8 V. The initial voltage jump from zero to $V_1$ is recorded, which is followed by a steady increase in voltage until $V_{max}$ is reached. The three-way switch in FIG. 3 is in the position marked A.
2. Opening the circuit and letting the voltage drop from $V_{max}$ to a steady-state value $V_2$. At this stage, the switch is the position shown in FIG. 3.
3. Discharging the ultracapacitor by shorting the circuit through a resistor of known resistance. The three-way switch is in the B position, and the voltage drops from $V_2$ to zero.

The above-described procedure was fully automated and computer controlled so that the test could be repeated cyclically for an extended period of time.

Figure 4:
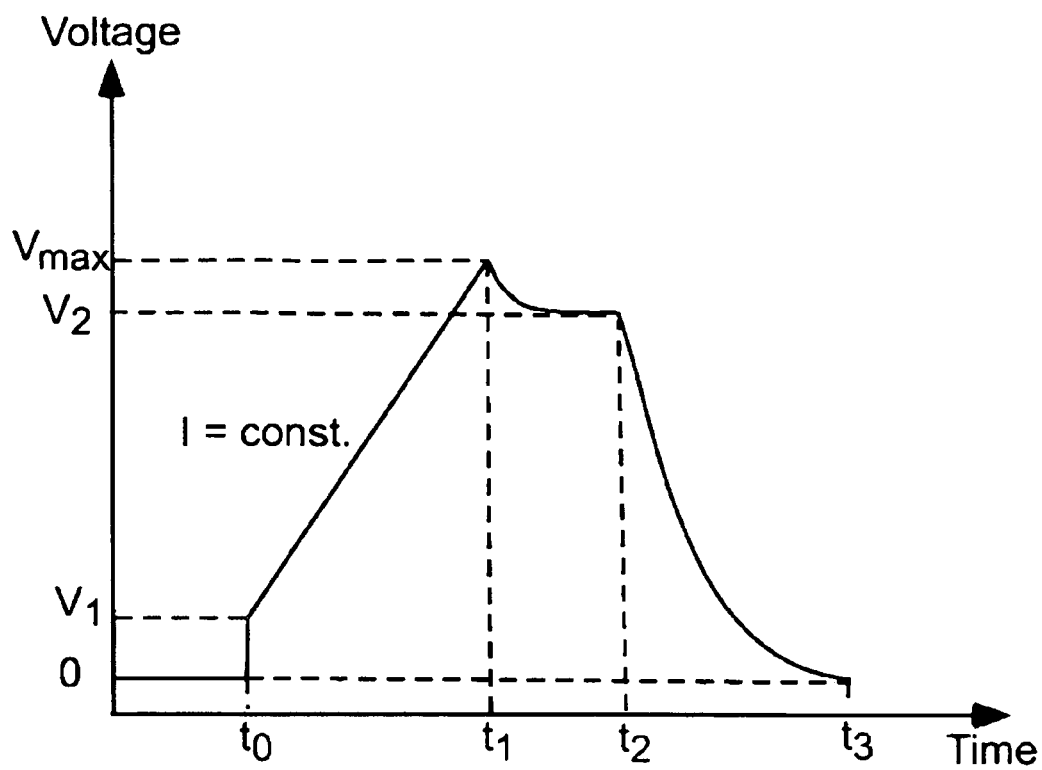
FIG. 4 is a graph showing the voltage-time profile used for ultracapacitor testing.

Referring to FIG. 3 and FIG. 4, capacitance can be determined for ultracapacitor charge or discharge, using the following formulae:

$$C_{charge} = I \times \frac{t_1 - t_0}{V_{max} - V_1}$$

and $$C_{discharge} = \frac{\int_{t_2}^{t_3} I(t)\,dt}{V_2} = \frac{\int_{t_2}^{t_3} V(t)\,dt}{RV_2}$$

The above equations represent total cell capacitance, expressed in Farads, and to obtain specific capacitance per electrode (F/g or F/cm$^3$), one needs divide the above values by weight (or volume) of both electrodes and multiply the result by four.

Figure 5:
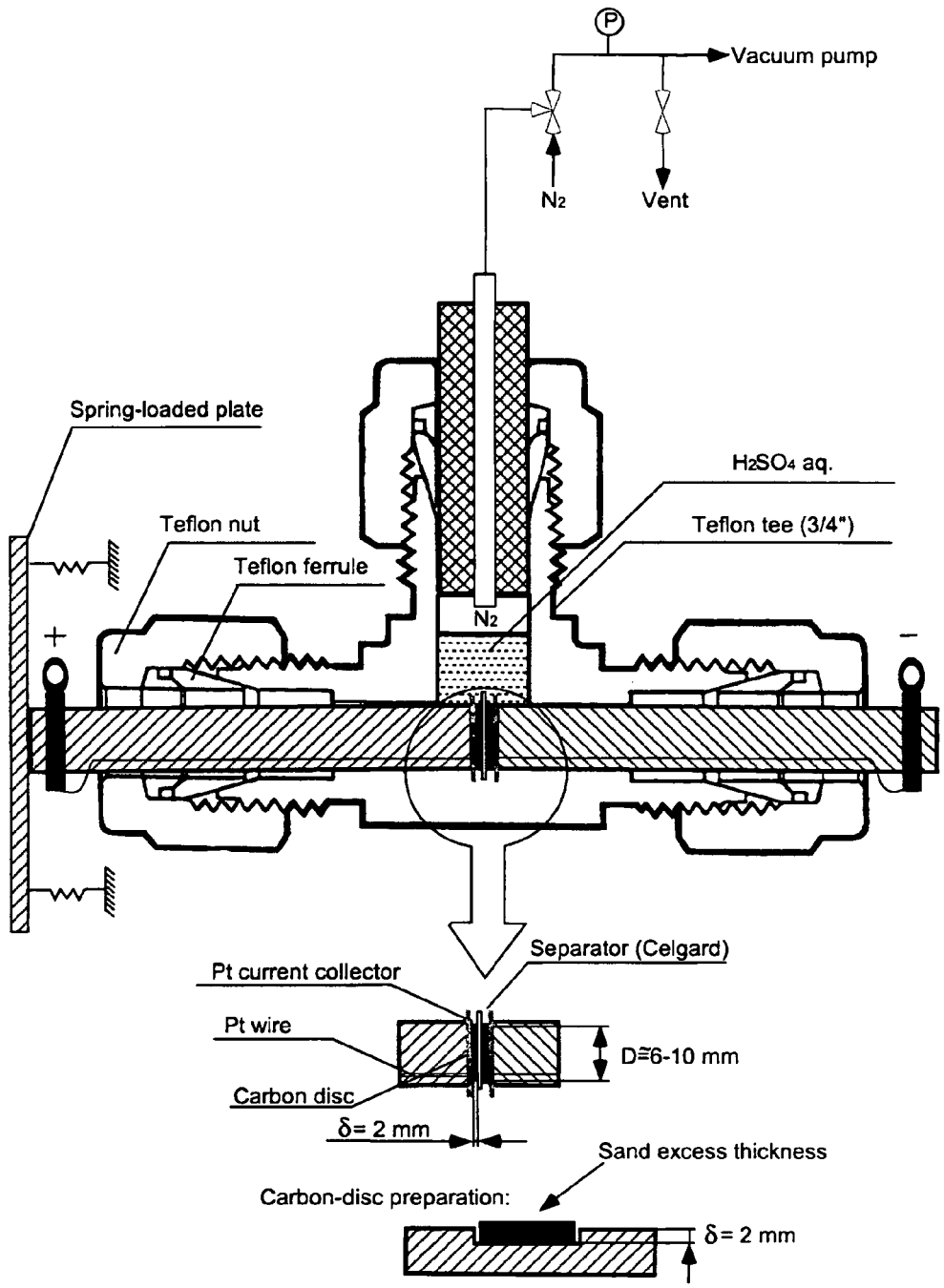
FIG. 5 is a schematic representation of an ultracapacitor electrode test cell.

A simple test cell was assembled within a Swagelock ¾" teflon tee, as shown in FIG. 5. The device included two spring-loaded teflon rods which held in place two identical carbon-disc electrodes. The electrodes were separated by a thin sheet of Celgard, and two platinum discs, placed between the teflon rods and the electrodes, served as current collectors. The collectors were connected to the circuit by means of platinum wires.

The electrode assembly was immersed in a 1 N aqueous solution of sulfuric acid, and care was taken to exclude oxygen from the test-cell assembly. This was done by cell evacuation and backfilling with nitrogen prior to each run. The electrodes were placed within the cell in a nitrogen-purged glove box. In fact, the electrode material was never exposed to oxygen after the polymer pyrolysis and carbon activation were completed.

Every effort was made to ensure uniform electrode thickness, and this was done by hand-machining each electrode prior to runs using a simple device shown in FIG. 5. A different set of electrodes was used for each experiment. Prior to commencing experiments with PVDC carbon electrodes, the above-described system was extensively tested using commercial 5 F and 10 F reference ultracapacitors.

Figure 6:
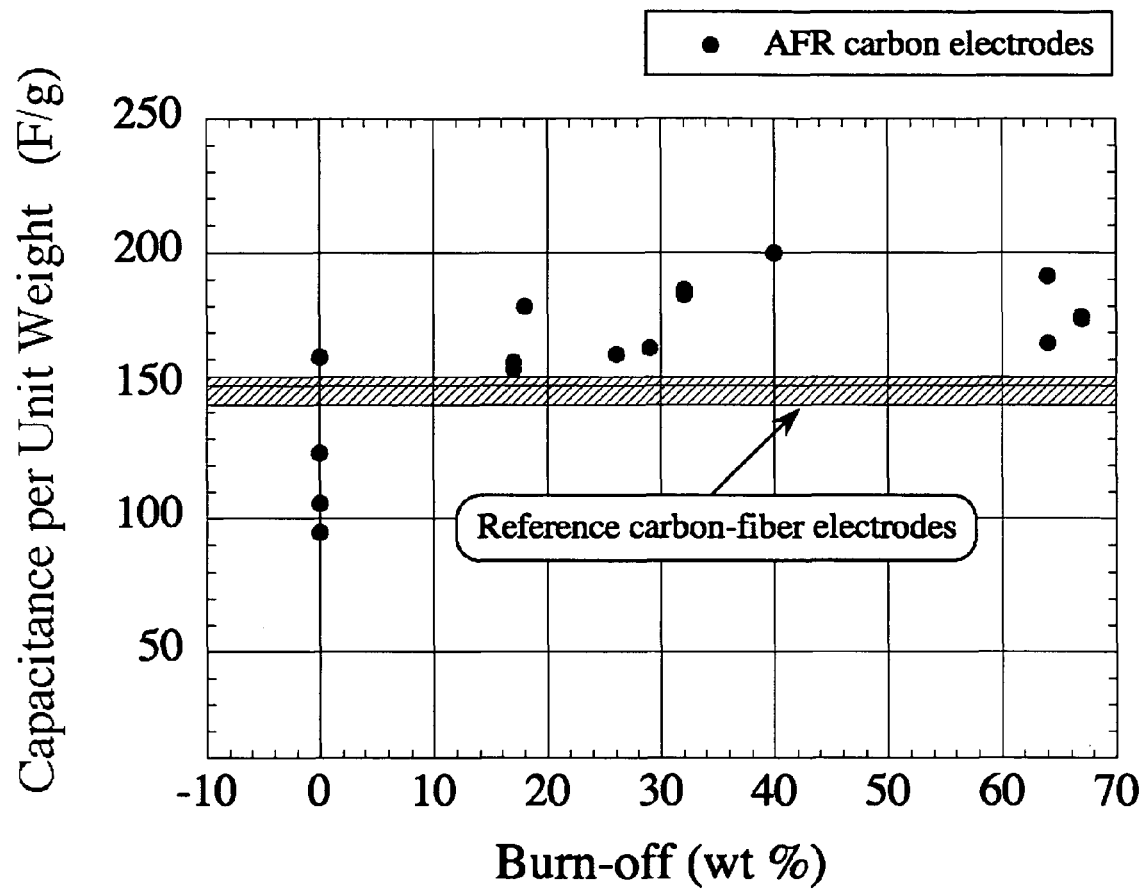
FIG. 6 is a graph showing specific capacitance on a per-unit-weight basis as a function of carbon burn-off for AFR ultracapacitor electrodes. The capacitance of reference materials was found to fall into the indicated range at a 95% confidence level. All data were obtained using the same cell and similar conditions. Specific capacitance was determined from cell-discharge data.
Figure 7:
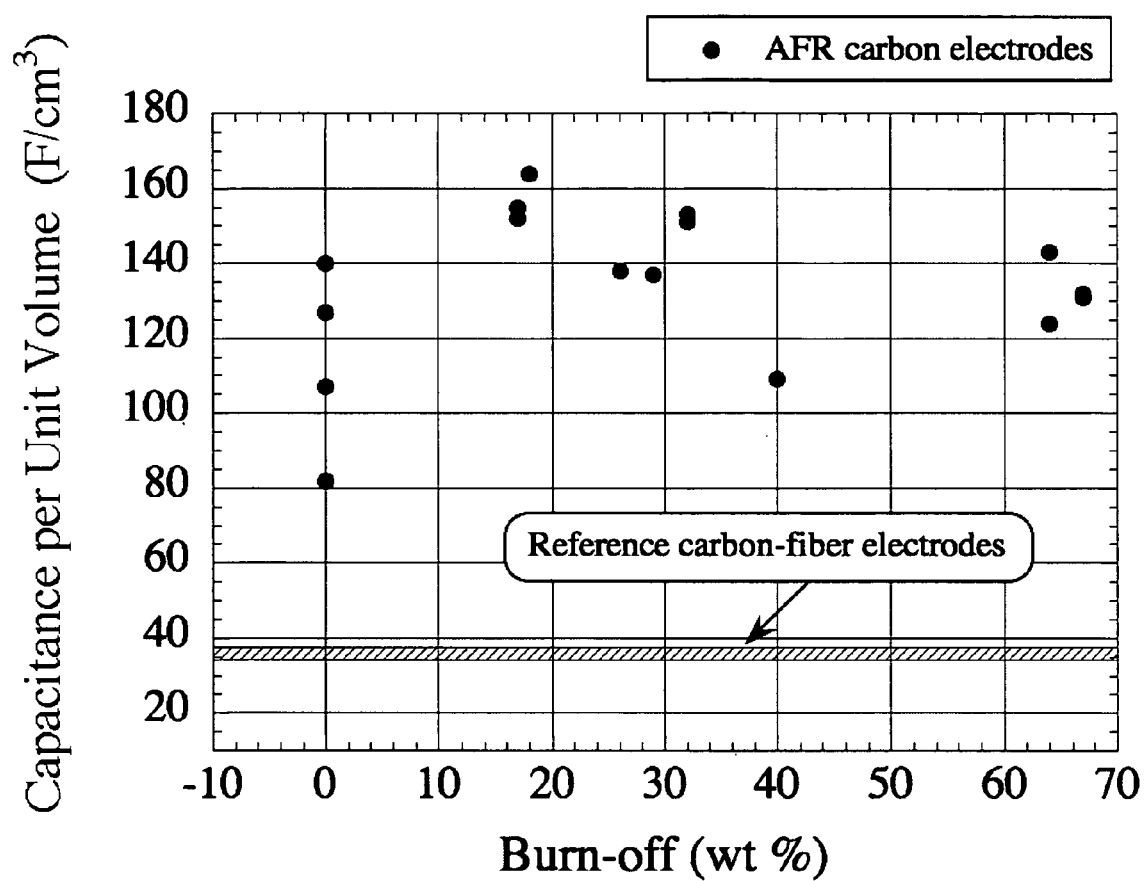
FIG. 7 is a graph showing specific capacitance on a per-unit-volume basis as a function of carbon burn-off for AFR ultracapacitor electrodes. The capacitance of reference materials was found to fall into the indicated range at a 95% confidence level. All data were obtained using the same cell and similar conditions. Specific capacitance was determined from cell-discharge data.

A number of carbon discs were tested, along with commercial carbon fiber electrodes, which were used as a reference for our data. The experimental and data-processing procedures described above were followed, and the results are shown in FIG. 6 and FIG. 7. Since the specific-capacitance data for charge and discharge were quite similar, only the discharge values are reported.

It is fair to conclude that the carbon-preparation technique and the polymer-based precursor offer unique advantages over the currently available materials (see FIG. 6 and FIG. 7). These results clearly demonstrate that the capacitance of PVDC carbons on a per-unit-weight basis (~100-200 F/g) can be up to ~30% better than the capacitance of the carbon-fiber electrodes (148±6 F/g). On a per-unit-volume basis, PVDC electrodes are a factor 3-4 better than the reference electrodes (80-160 F/cm$^3$ versus 36±2 F/cm$^3$). Both the PVDC and reference electrodes were tested under identical conditions.

Equivalent Series Resistance (ESR)—

In a separate effort, ways to reduce ESR were investigated. The starting material for electrode preparation was again PVDC. The granular polymer was pressed into discs using a die, 12.9 mm in diameter, and a five-ton pressure applied for 5 seconds. Several batches of carbonized PVDC discs were prepared as well as a batch of PVDC carbon that was activated using a cyclic oxygen-chemisorption/thermal-desorption technique described before.

Some electrodes were coated with a metallic layer to reduce contact resistance between the carbon and current collectors. A deposition process that integrates a thin metallic current collector (1-10 μm thick) with one surface of the electrode was developed. This metal coating is expected to vastly simplify the construction of ultracapacitors by removing the need for powerful compression forces that are customarily used to reduce contact resistance. We used aluminum and nickel as contact materials because of their good electrical conductivities and because of their resistance to chemicals commonly used as ultracapacitor electrolytes (acetonitrile-based electrolyte). Nickel is also expected to be compatible with inorganic acidic electrolytes, such as aqueous sulfuric acid.

The metal contacts were deposited by DC magnetron sputtering in a high vacuum system. Sputtering is a physical vapor deposition (PVD) technology commonly employed in deposition of electrical metal contacts. It involves removal of material as atoms or molecules from a target (mounted on a sputter source) by ion bombardment (typically argon ions) and deposition of target atoms or molecules as layers on a substrate. Since sputtering is a line-of-sight deposition process, shadow masks can be utilized to limit metal deposition to only the desired contact areas. The potentially high deposition rates (1 μm/min and higher) achievable by using this technique are ideal for this application.

The methodology we used involved the deposition of a single layer of metal (using a pure metal target of nickel or aluminum) directly onto the carbon electrode. The sputter power used was 150 W and 300 W, and argon pressure was 2 mTorr. Good results were obtained for samples coated at room temperature and, thus, it was decided that sample heating was unnecessary.

The deposition chamber is an O-ring sealed, stainless steel six-way cross pumped by a turbomolecular pump. The system includes a two-inch magnetron sputter source (AJA International), which contains the high purity metal target, mounted in a downward configuration. A sample mount and shadow mask that holds up to seven carbon electrodes is shown placed on a water-cooled plate. The sample- to-target distance is approximately two inches. The shadow mask prevents deposition on the carbon electrode edges. Prior to depositing metal on the carbon electrodes, a movable shutter, attached to a linear translation feedthrough, is inserted between the samples and the sputter source in order to "presputter" the metal target. This step removes surface impurities from the metal target that would otherwise contaminate the deposited coating.

The deposition rates for the aluminum and nickel coatings were estimated as follows. Coatings of each were deposited on flat, smooth glass substrates. The film thicknesses (t) were calculated by measurements of sheet resistance ($R_s$), using a four-point probe, from the following relationship: $t=\rho/R_s$, where $\rho$ is the metal resistivity. A time-averaged deposition rate was then calculated based on the coating period. Using bulk values of resistivity for Al and Ni (2.67 μΩ-cm and 6.84 μΩ-cm, respectively), the deposition rates for Al and Ni were determined to be 0.11 μm/min and 0.063 μm/min, respectively, at sputter powers of 150 W and an argon pressure of 2 mTorr.

In order to evaluate the effectiveness of metal coating for reducing the contact resistance of the carbon electrodes, two-point resistance measurements were performed on double-side coated carbon electrode samples. The samples were placed between two flat-tipped, spring-loaded contact probes attached to a Fluke model 8842A multimeter with a measurement sensitivity of 0.001 Ω.

Figure 8:
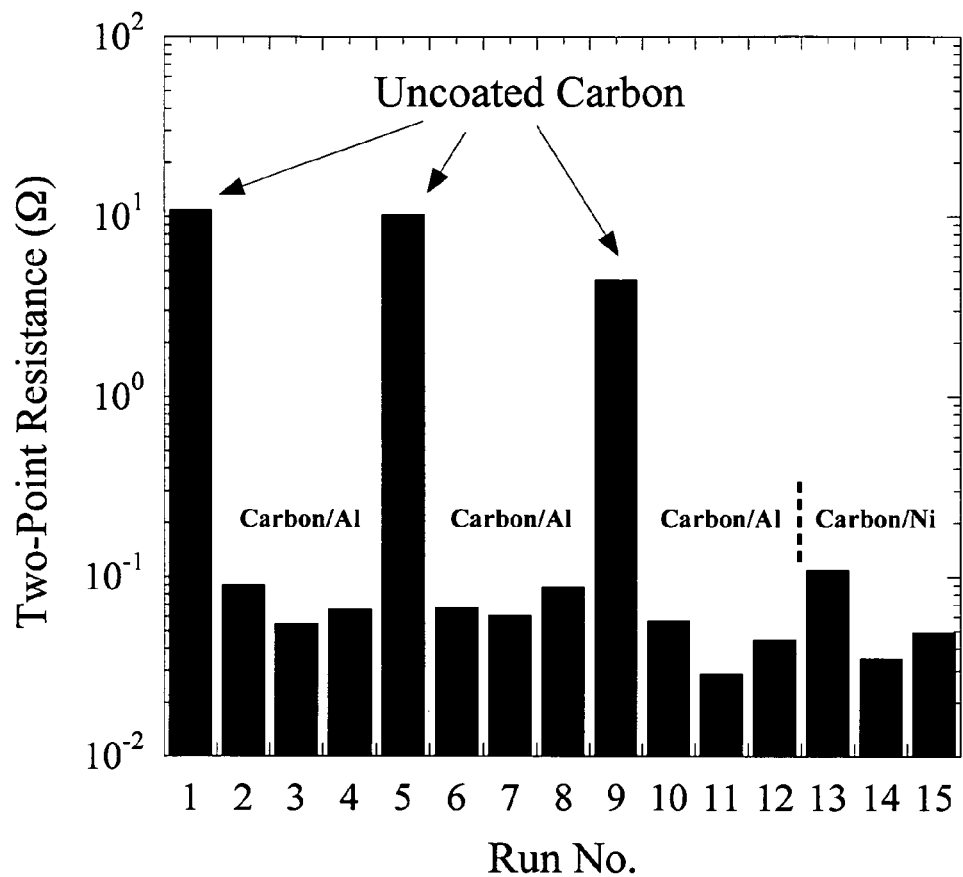
FIG. 8 is a graph showing the comparison of two-point resistance measurements on carbon electrodes with and without metallic coating (aluminum or nickel).

Results are summarized in FIG. 8. The most important finding is that contact resistance is reduced about two orders of magnitude when carbon electrodes are coated with aluminum or nickel, as shown in FIG. 8. (It should be noted that the scale is logarithmic.) These data provide a direct proof of feasibility for our concept of reducing contact resistance by coating carbon surface with a metallic layer. Another important conclusion is that the overall resistance is dominated by contact resistance. (It was found that the effect of the carbon-sample thickness was negligible.)

The limited data showed that the contact resistance decreases with increasing metal thickness. The Scanning Electron Microscopy (SEM) images showed a clear development of a more uniform and continuous metallic layer with increasing coating thickness. This is consistent with the observed trend of lower resistance at increased aluminum thickness. Similar results were obtained for nickel-coated electrodes.

2.2. Multifunctional Carbon for Ballistic/MMOD Protection Combined with Ultracapacitor Electrodes The innovation is the use of a lightweight, dual-function alternative to Enhanced Small Arms Protective Insert (E-SAPI) plates, which results in a significant weight reduction at the same level of ballistic protection. The two functions associated with the use of high-strength porous carbon are: (1) ballistic protection; and (2) individual soldier's energy-storage device (an ultracapacitor) that is lightweight, compact, and quickly rechargeable.

E-SAPI Plates and Their Limitations—

The Small Arms Protective Insert (SAPI) is a ceramic plate used by the US military [39]. It was first used in the Interceptor body armor, a bulletproof vest. It is now also used in the Improved Outer Tactical Vest as well as the Modular Tactical Vest, in addition to commercially available "plate carriers." In May 2005, the US military began replacing the standard SAPI plates with the Enhanced Small Arms Protective Insert (E-SAPI) [40, 41]. An ESAPI provides protection from armor piercing bullets, is about 35% lighter than SAPI, but costs about $600 per plate, i.e. 50% more than SAPI plates [41]. E-SAPI plates are made of boron carbide, and they are produced by Ceradyne, BAE Systems, and ArmorWorks Enterprises [42].

The current weight of a medium-size E-SAPI is about 5.45 lb [43], and the Marine Corps would like to reduce the armor-plate weight to 4.25 lb, i.e. by about 20%, while providing the same protection as the E-SAPI plates. This includes protection against specific 5.56 mm and 7.62 mm ball and armor piercing (AP) rounds, with detailed performance characteristics given in reference [43].

Portable Energy Storage and its Limitations—

High rate energy storage devices, such as batteries, ultracapacitors (UCs), and flywheels, are critical enabling technologies for fuel cell powered vehicles and hybrid electric vehicles (HEVs). The shorter lifetime and poorer high-current handling of batteries as well as safety concerns related to the use of high-speed flywheels suggest that UCs will ultimately be most useful in pulse-power weapons, communication devices, and other military applications as well as civilian and military HEV regenerative braking systems. The greater operating temperature range, excellent long-term performance, and lower weight are additional factors that support UCs in the long term. Overall, the ability of UCs to provide extreme surge power capabilities over a wide temperature range will yield immediate benefits to the warfighter in weight reduction, efficiency, and performance in areas as disparate as hybrid electric vehicles, cellular phones, military systems (e.g., communication equipment, such as radios, sensors, LASER target designators, actuators, portable tools, back-up power, rail-guns, and aircraft electromagnetic launchers), and numerous commercial and medical pulse-power applications.

UCs provide a unique combination of longevity, high-power charge/discharge cycling, extended operational temperature range, and significant power/energy density. In combination, these system benefits will provide operational advantages to the warfighter. Some of them are given below.

(1) A soldier carries a thermos-sized UC in his pack and uses it to recharge small battery cells that are used to operate various small pieces of equipment (SDR, target designator, flashlight, GPS, etc.). The advantage of using a UC rather than a battery is that he can recharge it in just a few seconds by tapping into the power-outlet on a passing support vehicle. The power-tap could be a quick-connect or even an induction-based system. Then, once the UC is charged, the soldier can recharge the dependent batteries for various devices more slowly. Since the energy storage medium (the UC electrodes) is nanostructured carbon, and does not contain heavy metals like nickel or cadmium, environmental contamination risks are minimized, should a UC be left behind in the field.

(2) Small UCs provide the pulse power required for a new generation of software-defined radio. New SDR radios having exotic bandwidths require larger pulse-power capabilities that rapidly degrade and deplete standard batteries. To avoid oversized batteries, an UC subsystem is used to provide the high-power pulses, with more standard batteries being used to recharge the UC's. The result is a lighter, smaller system with much more talk-time and batteries that need to be replaced less frequently. The UCs last for a million or more cycles. Other uses include LASER target designators and other devices that would benefit from decoupling pulse-power and energy-storage.

(3) UC PVDC-derived electrodes developed by us have been demonstrated to be hard, extremely strong, and resistant to fracture, making them an ideal ballistic protection material. The UC bank can be fabricated as conformal plates designed to provide ballistic protection similar to that of E-SAPI plates, or in places where E-SAPI plates are not currently used. Testing has demonstrated that these carbon plates have significant fracture/toughness and are therefore under consideration for use as supplemental micro-meteorite shielding. A small personal-sized power grid would ensure both safety and utility. Destructive testing of UC's has demonstrated that destroying UCs does not expose those nearby to excessive heat or other threats.

Current UCs face the following challenges in the market place: (1) technical performance in terms of meeting minimum energy and power density requirements; and (2) high cost. The price of UC electrode material dominates the cost of ultracapacitors. In view of the above considerations, there exists a strong need to reduce the weight of the protective armor carried by the soldier as well as to provide an efficient, compact, lightweight and quickly rechargeable portable energy-storage device, which will lead to further weight reduction. A description of a particular embodiment illustrating the use of high-strength porous carbon plates as ultracapacitor electrodes and armor plates is given below.

In reference to FIG. 9, therein diagrammatically illustrated as FIG. 9a is a garment (in the form of a vest or jacket), generally designated by the numeral 10, having a pocket 12. A container or enclosure 14, made of a gas-impermeable material, is emplaced in the pocket 12. Within the enclosure, as seen in FIG. 9b, there is a pair of plates or panels 20 fabricated from a high-strength, porous carbon material made in accordance with the description herein provided. Each panel is of generally planar form; for maximum mechanical protection, the panels would normally be wide relative to their thickness. Confronting surfaces 21 of panels 20 define a space in which an electrolyte material and separator 27 is contained (adapting the panels to function as electrodes of either a battery assembly or an ultracapacitor). Each carbon panel has optionally a layer of metal applied thereto (as by sputtering), with which a current collector 24 is in contact. A wire conductor 26 is, in turn, attached to each current collector 24. An alternative configuration would be porous carbon filling the entire space within compartment 14, serving as a gas-storage medium, with the internals relevant to the electric energy storage 20, 21, 24, 26, and 27 removed. In this case a gas port 28 would be supplied so that the gas can flow into and out of the storage container. Such a gas storage system would also serve as armor protection.

Figure 10:
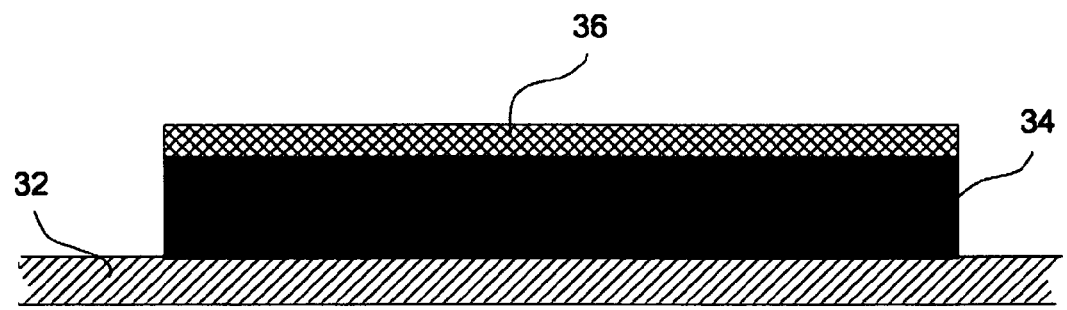
FIG. 10 is a diagrammatic illustration of an armored vehicle embodying the invention.

The above application can be scaled up to provide armored-vehicle protective shields made of PVDC carbon (or similar carbon) that doubles as ultracapacitors electrodes. FIG. 10 diagrammatically illustrates part of a vehicle (e.g., a motor vehicle, an aircraft, or a space vehicle), including a wall section 32. A planar ceramic protective plate 36 is attached to the surface of the wall section 32. A second plate 34, fabricated from a high-strength porous carbon material made in accordance with the present description, is superimposed upon the ceramic plate 36 or placed between the ceramic plate 36 and the wall section 32. Although the ceramic plate may be stronger and thus afford greater protection than the carbon plate, the latter may serve to reduce the overall weight of the armor. In appropriate circumstances, moreover, it may comprise an element of an electrical device similar to that described with reference to FIG. 9. It will be appreciated by those skilled in the art that the garment assembly shown in FIG. 9 may also contain other reinforcing elements, such as ceramic armor plates, in addition to high-strength porous carbon. Furthermore, it should be appreciated that the high-strength porous carbon can be used as electrodes for either ultracapacitors or batteries in the above-described applications.

3. Carbon for Ballistic/MMOD Protection Combined with Gas Storage

Microporous carbon is well known to be ideal for gas-storage applications, as evidenced by voluminous literature data on this subject. Our PVDC carbon monoliths were demonstrated to be excellent hydrogen sorbents [1,6-16, 23] as well as sorbents of toxic gases such as arsine, phosphine, and boron trifluoride (patent pending PCT/US2008/007948). In view of the above, and because of the exceptional strength of our carbon monoliths, a multifunctional use of PVDC carbon monoliths can be realized wherever gas storage could be advantageously combined with ballistic or MMOD protection. Examples include, but are not limited to, spacecraft, solar-storm shelters, armored vehicles, and individual soldier's equipment. In particular, it will be apparent to those skilled in the art that compartment 14 of the garment assembly shown in FIG. 9 can contain a monolithic high-strength porous carbon insert appropriate for gas storage instead of the electric energy storage device. In this case, the appropriate gas port 28 and a valve and gas-line assembly would be necessary to provide for the flow of gas into and out of the storage container. Likewise, high-strength porous carbon shields similar to the one shown in FIG. 10, enclosed in appropriate gas-impermeable compartments or conformal tanks and fitted with suitable valves and gas lines, could be used for both gas storage and ballistic protection.

4. Carbon for Radiation Shielding Combined with Gas Storage, Ultracapacitor Electrodes, and/or Structural Strength 4.1. Radiation Shielding Intense radiation of astrophysical origin exists above the Earth's atmosphere. Such radiation, in the form of energetic, charged particles, is especially problematic within and above the Earth's geo-magnetic radiation belts (van Allen belts). This radiation is sufficiently strong that it is one of the main limitations on long-term human habitation and exploration activities.

The NASA objective of human exploration of the solar system and robotic discovery missions throughout space will require a means for protecting people and electronics from the hazards of astrophysical radiation (galactic cosmic rays, GCRs, and solar energetic particles, SEPs). This radiation protection must be supplied without excessively encumbering a mission with parasitic shielding. The PVDC carbon monoliths we have developed can addresses two vital issues for long-term space travel activities, i.e., radiation shielding and efficient use of the mass-budget. While both of these problems have been studied for many years, there is currently no satisfactory technology for providing non-parasitic shielding with adequate protection. Indeed, even in low-Earth orbit, astronauts must be closely monitored for radiation exposure. In addition to the personal and economic costs associated with this radiation exposure, some missions simply cannot be performed due to the current, inadequate ability to shield astronauts (e.g., a trip to Mars, a lunar base, or even long-term habitation of the ISS). The multi-functional carbon electrodes we developed will enable mission planners to replace some parasitic shielding and less desirable power devices. In addition, the use of compressed-gas hydrogen adsorbed on microporous carbon combined with radiation shielding provided by the carbon sorbent is of interest. In all of these cases, the benefits accrue in a non-parasitic manner since structural elements and pressure vessels provide additional, mission-relevant benefits. This technology also offers advantages in other aerospace applications such as for roofing over lunar or Martian habitats.

Crew safety critically depends on effective radiation shielding, and current estimates of deep-space radiation dose exceed present administrative limits applicable for low Earth orbit (LEO). The space radiation component that is most significant for radiation shielding requirements outside Earth's magnetosphere is Galactic Cosmic Rays. Their elemental composition is approximately 85% hydrogen nuclei (protons), 14% helium nuclei (alpha particles), and 1% heavy nuclei. The GCR flux contains all the elements with a predominance of the most stable nuclei such as hydrogen, helium, carbon, oxygen, neon, magnesium, silicon and iron. The median energy of GCRs is nearly 2 billion electron volts (2 GeV/nucleon), with an approximate power-law fall-off in number at larger energy. GCR particles are both more energetic than the SEPs and are comprised of, in some cases, much heavier nuclei. Fortunately, the GCR flux is relatively constant in time [44]; however, the SEP flux is not. Indeed, during solar outbursts, the radiation exposure of unshielded or poorly shielded astronauts can be lethal [45].

Thus, there exists a strong need to develop materials that would provide effective shielding for astronauts. Such materials should have some of the following characteristics: (a) excellent radiation shielding, (b) light weight, (c) mechanical strength, (d) thermal insulation, and (e) dual-use applications (e.g., energy storage utility).

4.2. Non-Parasitic Radiation Shielding

We have demonstrated that our PVDC microporous carbon manufacturing method can be used to develop an important new aerospace material with the following properties: radiation shielding, hydrogen-storage capability, energy storage (ultracapacitors), and structural strength. This multifunctional material provides non-parasitic shielding, is inexpensive, is environmentally benign, and can be mass-produced now. The specific benefits associated with our carbon preparation technique are:

Our hydrogen sorbent material is multi-functional, providing (a) non-parasitic radiation shielding, and (b) proven energy-storage (ultracapacitors)

Its carbon matrix is known to exhibit good radiation shielding properties;

The integration of these functions means that significant increases in mission capability and safety are possible while reducing equivalent system mass, by up to 40%, based upon our previous results;

Good control over carbon pore structure and, thus, over its shielding and energy storage properties;

Material has great mechanical strength and hardness combined with light weight (0.5-1.0 g/cm$^3$);

Activated carbon sorbent is environmentally benign.

A concept has been developed of storing hydrogen in a carbon-filled metal or plastic shell, with the entire system serving as an effective radiation shield against both Galactic Cosmic Rays and Solar Energetic Particles, as well as other types of ionizing energy. The Shielding/Storage Unit (SSU) is designed in such a way that shielding is provided even when almost no hydrogen is present in the storage space. In our experiments, we built a sub-scale prototype 5.5" across, and it was found to diminish the kinetic energy of 1000 Gev/nucleon $^{48}$Ti by an impressive 25%. It is possible in principle to determine a combination of burn-off fraction and pore-size distribution to maximize the hydrogen storage (see references [1,6] and U.S. Pat. No. 6,626,981 [23]) and radiation shielding properties [46, 47] of the carbon sorbent. In addition to direct measurements at accelerators, we modeled the shielding behavior using the state-of-the-art radiation shielding packages HZETRN [48] and HETC-HEDS [49]. In a previous investigation we also used SIREST [50].

We have performed experimental work at the Relativistic Heavy Ion Collider (RHIC) located at the NASA Space Radiation Laboratory (NSRL) particle accelerator, and at the Loma Linda University Medical Center proton accelerator. An analysis of the data from the NSRL Digital Beam Imager's radiograph shows that the aluminum-composite pressure cylinder attenuated the kinetic energy of the beam's 1000 AMeV Ti ions by ~13%, when the beam passed through the SSU. The carbon sorbent further attenuated the beam by another factor of 0.87, for a combined average kinetic energy reduction of ~24%. Measurements using the Tissue Equivalent Proportional Counter (TEPC) find that the average kinetic energy reduction of the particles was ~25%, in close agreement with the radiographic evidence.

We evaluated a sub-scale prototype, so the incident beam was not fully attenuated. Therefore, the radiation dosimetry results of the RHIC data indicate that the materials that comprised the SSU absorbed a fraction of the energy of the incident Ti ions (approximately 25%), and this led to an increase in the linear energy transfer (LET) of the Ti ions downstream of the tank. The LET is the amount of energy deposited per unit length in a material and depends on the interactions of incident ions with the target materials. The data show a measurable contribution of the sorbent to the reduction of the kinetic energy of Ti ions. An analysis of the lineal energy spectra response functions produced by the TEPC during the experiments that included the fuel tank indicated that a measurable fraction of the incident Ti ions underwent nuclear fragmentation while traversing the fuel tank and sorbent material. This component of particles with lower Z (atomic number) than Ti contributed to a small decrease in the average quality factor (Q) as measured by the TEPC. In a realistic, multi-layer configuration that is combined with the spacecraft's aluminum skin, the vast majority of space radiation particles would "range-out," and not affect astronauts.

The Loma Linda proton experiments indicate that the sorbent increases the energy threshold for stopping energetic protons. That is, when the sorbent is in the beam, it takes higher energy protons to traverse the SSU. This result is most significant for applications in low earth orbit, but also indicates shielding gains for solar particle events (SPE), i.e. Solar Storms.

Conclusions from our theoretical study also suggest that the tank with sorbent provides added protection against solar and galactic cosmic radiation over that provided by an equivalent thickness (areal density) of aluminum. For galactic cosmic rays, the use of the sorbent filled cylinders in place of pure aluminum should result in significant mass savings (possibly as much as 40%) for the same crew organ dose and dose equivalent exposures. For exposures from large solar energetic particle events, such as the October 1989 event sequence, the crew organ exposures could be reduced by 10-15% by using the sorbent-filled cylinders. Carbon-filled cylinders provide reductions in crew organ doses and dose equivalent over pure aluminum indicating that they serve as a multifunctional shield material. One possible use might be to use them in a multiple layer configuration to line the walls of a solar particle event "storm shelter" for the crew.

AFR developed a technology to increase the capacity of hydrogen storage tanks using carbon filler with a complex pore structure ("microporosity"). Due to the strong carbon-hydrogen interactions, the tank with the filler actually has, counter-intuitively, more capacity to store hydrogen than an empty pressurized tank. Using sorbent increases hydrogen storage capacity for existing tanks, or decreases the pressure for a given hydrogen storage capacity, with concomitant savings in required tank strength and weight. The greatest advantage over pressurized gas tanks is realized at relatively low pressures (e.g. ~180% more at 100 psi), but the advantage is still significant (~25%) at 3000 psi for some samples.

AFR's microporous carbon provides significant radiation shielding, as well as structural strength, while carrying out mission critical tasks. The carbon sorbent has proven valuable in both hydrogen storage and ultracapacitor applications. The fact that it is comprised of environmentally benign activated charcoal (carbon) and is a ready absorber of hydrogen means that it has excellent radiation shielding properties as well. Moreover, since carbon is a low-Z element (6 protons compared with 13 for Aluminum) secondary neutron production due to cosmic-ray interactions will be minimal, compared with higher-Z shielding materials. As part of a comprehensive radiation shielding program, our sorbent, and the devices which may be fashioned from it, will maximize the shielding while minimizing excess weight and therefore cost.

Preferred embodiments for radiation protection combined with either gas storage or electrical energy storage are not too different from the concepts shown diagrammatically in FIG. 9 and FIG. 10. Radiation shielding can be implemented as part of a personal protection system (FIG. 9), or as part of vehicular protective system (FIG. 10) in the form of generally flat or conformal panels or even as simple as conventional cylindrical gas tanks filled with the carbon material and lined up along vehicle walls, thus providing a barrier to radiation.

REFERENCES

1 Wójtowicz, M. A., Bassilakis, R., Leffler, M., Serio, M. A., Simons, G. A., Fuller, W., *Gas Storage Using Microporous Carbons*, Final Report, NASA Phase II SBIR contract No. NAS9-97012, Advanced Fuel Research, East Hartford, Conn., May 2000.

2 Wójtowicz, M. A., *Thermogravimetric Study of Active Sites in the Process of Low-Temperature Oxidation of Char*, Ph.D. thesis, Brown University, Providence, R.I., 19

3 Suuberg, E. M., Wójtowicz, M. and Cabo, J. M., "Oxidation and thermal annealing behaviour of phenol-formaldehyde chars," *Proc. Int. Conf. Carbon* (B. McEnaney and T. J. May, Eds), IOP Publishing, Bristol, U.K., 1988, pp. 325-327

4 Suuberg, E. M., Wójtowicz, M. and Calo, J. M., "Some aspects of the thermal annealing process in a phenol-formaldehyde resin char," *Carbon* 27, 3, 431-440, 1989

5 Suuberg, E. M., Wójtowicz, M. and Calo, J. M., "Reaction order for low temperature oxidation of carbons," *Twenty-Second Symposium (International) on Combustion*, The Combustion Institute, Pittsburgh, Pa., 1988, pp. 79-87

6 Wójtowicz, M. A., Serio, M. A., Smith, W. and Simons, G. A., *Gas Storage Using Microporous Carbons*, Final Report, NASA Phase I SBIR contract No. NAS9-19470, Advanced Fuel Research, East Hartford, Conn., June 1996

7 Wójtowicz, M. A., Markowitz, B. L. and Serio, M. A., "Microporosity development in carbons for gas-storage applications," a keynote lecture presented at the EUROCARBON '98 conference, Strasbourg, France, 5-9 Jul., 1998; *Proc. EUROCARBON '98: Science and Technology of Carbon*, AKK and GFEC, Strasbourg, France, 5-9 Jul., 1998, pp. 589-590.

8 Wójtowicz, M. A., Markowitz, B. L., Smith, W. W. and Serio, M. A., "Microporous carbon adsorbents for hydrogen storage," an invited keynote lecture, *Proc. Third International Conference on Materials Engineering for Resources (ICMR '98)*, Akita, Japan, 26-28 Oct., 1998, pp. 416-429.

9 Wójtowicz, M. A., Markowitz, B. L., Bassilakis, R. and Serio, M. A., "Hydrogen storage carbons derived from polyvinylidene chloride," a poster presented at the 1999 Hydrocarbon Resources Gordon Research Conference, Ventura, Calif., 17-22 January, 1999.

10 Wójtowicz, M. A., Smith, W. W., Serio, M. A., Simons, G. A., and Fuller, W. D., "Microporous carbons for gas-storage applications," *Proc. Twenty-Third Biennial Conference on Carbon*, the Pennsylvania State University, Jul. 13-18, 1997, vol. I, pp. 342-343

11 Simons, G. A. and Wójtowicz, M. A., "A model for microporosity development during char activation," *Proc. Twenty-Third Biennial Conference on Carbon*, the Pennsylvania State University, Jul. 13-18, 1997, vol. I, pp. 328-329

12 Simons, G. A. and Wójtowicz, M. A., "Modeling the evolution of microporosity and surface area during char activation," *Proc. 9th Int. Conf. on Coal Science* (A. Ziegler, K. H. van Heek, J. Klein and W. Wanzl, Eds.), DGMK, Hamburg, Germany, 1997, pp. 1783-1786

13 Simons, G. A. and Wójtowicz, M. A., "Modeling the evolution of microporosity in a char-activation process involving alternating chemisorption-desorption cycles," *Proc. EUROCARBON '98: Science and Technology of Carbon*, AKK and GFEC, Strasbourg, France, 5-9 Jul., 1998, pp. 273-274.

14 Wójtowicz, M. A., Markowitz, B. L., Smith, W. W. and Serio, M. A., "Microporous carbon adsorbents for hydrogen storage," *International Journal of the Society of Materials Engineering for Resources* 7 (2), 253-266, 1999

15 Wójtowicz, M. A., Markowitz, B. L., Simons, G. A. and Serio, M. A., "Gas-storage carbons prepared by alternating oxygen chemisorption and thermal desorption cycles," *ACS Div. of Fuel Chem. Prepr.* 43 (3), 585-590, 1998

16 Wójtowicz, M. A., Bassilakis, R., Leffler, M. P., Serio, M. A. and Fuller, W. D., "Adsorption of hydrogen on activated carbons derived from polyvinylidene chloride," Proc. First World Conf. on Carbon *EUROCARBON* 2000, Berlin, Germany, 9-13 Jul., 2000, vol. I, pp. 407-408.

17 Walker, P. L., Jr., Austin, L. G., and Nandi, S. P., "Activated diffusion of gases in molecular-sieve materials," in *Chemistry and Physics of Carbon*, P. L. Walker, Jr., Ed., vol. 2, Marcel Dekker, Ney York, 1966.

18 Winslow, F. H., Baker, W. O., and Yager, W. A., *Proc. 2$^{nd}$ Carbon Conf.*, Buffalo, N.Y., 1955, pp. 93-102 (quoted in reference 17).

19 Everett, D. H., Redman, E., Miles, A. J., and Davies, D. H., *Fuel* 42, 219, 1963.

20 Lamond, T. G., Metcalfe, J. E., III, and Walker, P. L., Jr., *Carbon* 3, 59, 1965.

21 Quinn, D. F. and Holland, J. A., U.S. Pat. No. 5,071,820 (1991).

22 MacDonald, J. A. F. and Quinn, D. F., "Carbon adsorbents for natural gas storage," *Fuel* 77, 61-64, 1988.

23 Wójtowicz, M. A., Serio, M. A., and Suuberg, E. M., "Microporous carbons for gas storage," U.S. Pat. No. 6,626,981 (2003).

24 Conway, B. E., *Electrochemical Supercapacitors, Scientific Fundamentals and Technological Applications*, Chapter 1, Kluwer Academic/Plenum Publishers, New York (1999).

25 Murphy, T. C., "U.S. Department of Energy ultracapacitor program update," in Preprints of the Annual Automotive Technology Development Contractors' Coordination Meeting, vol. I, Dearborn, Mich., Oct. 23-27, 1995

26 Sekido, S., Yoshino, T. Murananka, T. and Morimioto, *Denki Kagaku* 48, 40 (1985).

27 Nishino, A., Yosihida, A., Tanahashi, I., U.S. Pat. No. 4,562,511 (1985).

28 Yoshida, A., Nishino, A., Tanahashi, I., and Takeuchi, Y., U.S. Pat. No. 4,569,028 (1986).

29 Mayer, S. T., Pekala, R. W., and Kaschmitter, J. L., *J. of Electrochemical Soc.* 140, 446 (1993).

30 Becker, H. E., U.S. Pat. No. 2,800,616 (to General Electric Co.) (1957).

31 Verwey, E. J. W. and Overbeek, J. Th. G., "Theory of Stability of Lyophobic Colloids". Elsevier, Amsterdam, (1948).

32 Reerink, H., and Overbeek. J. Th. G., *Discuss. Faraday Soc.*, 18: 74 (1954).

33 Samec, Z., *J. Electroanal. Chem.* 103, 1 (1979).

34 Trasatti, S, and Buzzanca, G., *J. Electroanal. Chem.*, 29, App. 1 (1971).

35 Conway, B. E. and Kozlowska, H. A., *Acct. Chem. Res.*, 14, 49 (1981).

36 Hadzi-Jordanov, S., Conway, B. E., and Kozlowska, H. A., *J. Electrochem. Soc.*, 125, 1471 (1978).

37 Hadzi-Jordanov, S., Conway, B. E., and Kozlowska, H. A., *J. Electroanal. Chem.*, 60, 359 (1975).

38 Galizzioli, R., Tantardini, F., and Trasatti, S., *J. Appl. Electrochem.*, 4, 57 (1974).

39 Wikipedia (http://en.wikipedia.org/wiki/Small-arms_protective_insert)

40 GlobalSecurity.org (http://www.globalsecurity.org/military/systems/ground/interceptor.htm)

41 Defense Industry Daily. Defense Industry Daily, LLC; 2005 Aug. 23 (http://www.defenseindustrydaily.com/up-to-160m-for-enhanced-interceptor-vest-protection-updated-0986/)

42 Defense Industry Daily. Defense Industry Daily, LLC; 2008 Oct. 19 (http://www.defenseindustrydaily.com/plate-inserts-for-us-body-armor-04416/)

43 http://www.dodsbir.net/Topics/view_pdf.asp?id=REF%20N091-005%20PD%20Personal%20Armor.pdf 44 Tripathi, R. K., L. Simonsen, J. Nealy, P. Troutman and J. W. Wilson, "Shield Optimization in Simple Geometry for the Gateway Concept," Paper No. 2002-01-2332, 32$^{nd}$ ICES Meeting, San Antonio, Tex., Jul. 15-18, 2002

45 Wilson, J. W., Simonsen, L. C., Shinn, J. L., Kim, M.-H. Y., Cucinotta, F. A., Badavi, F. F., Atwell, W., "Astronaut exposures to ionizing radiation in a lightly shielded spacesuit," Paper #1999-01-2173, 29$^{th}$ ICES Meeting, Denver, Colo., Jul. 12-15, 1999
46 E. P. Rubenstein, M. A. Wójtowicz, E. Florczak, E. Kroo, M. A. Serio, August 2003, NASA Final Report, "Microporous Carbon for Radiation Shielding and Hydrogen Storage," Contract NAS1-03030.
47 E. P. Rubenstein, M. A. Wójtowicz, M. A. Serio, E. Kroo, August 2005, NASA Final Report, "Radiation Shielding and Hydrogen Storage with Multifunctional Carbon," Contract NNL05AA91P
48 J. Wilson, F. Badavi, F. Cucinotta, J. Shinn, G. Badhwar, R. Silberberg, C. Tsao, L. Townsend, & R. Tripathi: HZETRN: Description of a Free-Space Ion and Nucleon Transport and Shielding Computer Program. NASA TP 3495, May 1995
49 Townsend, L. W.; Miller, T. M.; and Gabriel, T. A.: HETC Radiation Transport Code Development for Cosmic Ray Shielding Applications in Space. *Radiation Protection Dosimetry* (2005).
50 B. D. Johns, K. Y. Fan, R. C. Singleterry, "Development of a Collaborative Engineering Environment," Paper No. 2002-01-2552, 32$^{nd}$ ICES Meeting, San Antonio, Tex., Jul. 15-18, 2002

Having thus described the invention, what is claimed is:

1. A protective assembly, comprising: as an article of manufacture, a garment to be worn by an individual; and at least one high-strength porous carbon member operatively assembled with said article of manufacture, said carbon member being the product of a method for the production of high-strength porous carbon, comprising the following steps, carried out in the order set forth:
  a. providing a suitable sorbent precursor material that is subject to carbonization;
  b. effecting carbonization of said sorbent precursor material by heat-treatment in a non-oxidizing atmosphere;
  c. optionally effecting activation of said carbonized sorbent precursor material using any suitable method;
  d. optionally effecting heat-treatment of said carbonized sorbent precursor material at a temperature in the range of about 800° C. to about 2,000° C.; and
  e. optionally conditioning the surface of said heat-treated sorbent precursor material by contacting said surface with a reducing gas,
said suitable sorbent precursor material being a material selected from the group consisting of polyvinylidene chloride (PVDC), polyfurfuryl alcohol, phenolic resin, and blends of these materials.

2. The assembly of claim 1 wherein said garment includes at least one compartment in which said carbon member is contained.

3. The assembly of claim 2 wherein said at least one compartment contains a second member of generally planar form disposed in superposed relationship with said at least one carbon member, said second member being of a composition different from that of said at least one carbon member and also being of high strength to perform a mechanically protective function.

4. The assembly of claim 1 wherein said at least one carbon member is about one to five centimeters thick.

5. The assembly of claim 2 wherein said at least one compartment is effectively gas-impermeable, and wherein said garment additionally includes at least one closeable passage operative selectively to provide gas flow communication between the exterior and the interior of said compartment, said compartment thereby constructed for the containment and discharge of a gas within and from pores of said at least one carbon member.

6. The assembly of claim 2 wherein said at least one compartment contains a plurality of said carbon members, at least two of said carbon members being of generally planar form and having mutually confronting surfaces spaced from one another; said garment assembly additionally including an electrolyte disposed in the space defined between said mutually confronting surfaces, and an electrical current collector on each of said at least two carbon members, said at least two carbon members and said electrolyte comprising an electrical circuit component.

7. The assembly of claim 6 wherein said electrical circuit component is functional to store electric energy.

8. The assembly of claim 6 wherein said electrical circuit component is functional to provide effective capacitance.

9. The assembly of claim 6 wherein each of said at least two carbon members has a generally conformal metallic deposit thereon disposed beneath said electrical current collector thereof.

10. The assembly of claim 6 wherein the space between said mutually confronting surfaces is about 0.001 to 5 millimeters thick.

11. The assembly of claim 1 wherein said sorbent precursor material is of shaped monolithic form.

12. The assembly of claim 11 wherein said at least one carbon member is of generally planar form.

13. A protective assembly comprising: as an article of manufacture, a vehicle having at least one wall; and at least one high-strength porous carbon member operatively assembled with said at least one wall, said carbon member being the product of a method for the production of high-strength porous carbon, comprising the following steps, carried out in the order set forth:
  a. providing a suitable sorbent precursor material that is subject to carbonization;
  b. effecting carbonization of said sorbent precursor material by heat-treatment in a non-oxidizing atmosphere;
  c. optionally effecting activation of said carbonized sorbent precursor material using any suitable method;
  d. optionally effecting heat-treatment of said carbonized sorbent precursor material at a temperature in the range of about 800° C. to about 2,000° C.; and
  e. optionally conditioning the surface of said heat-treated sorbent precursor material by contacting said surface with a reducing gas,
said suitable sorbent precursor material being a material selected from the group consisting of polyvinylidene chloride (PVDC), polyfurfuryl alcohol, phenolic resin, and blends of these materials.

14. The assembly of claim 13 wherein said sorbent precursor material is of shaped monolithic form.

15. The assembly of claim 13 wherein said vehicle is selected from the group consisting of motor vehicles, aircraft, and space vehicles.

16. The assembly of claim 13 wherein said vehicle includes a gas-impermeable compartment in which at least one high-strength porous carbon member is enclosed.

17. The assembly of claim 14 wherein said at least one carbon member is of generally planar form.

18. The assembly of claim 13 wherein said assembly comprises a second member of generally planar form disposed in superposed relationship with said at least one carbon member, said second member being of a composition different from that of said at least one carbon member and also being of high strength to perform a mechanically protective function.

19. The assembly of claim 13 wherein said at least one carbon member is about one to one hundred fifty centimeters thick.

20. The assembly of claim 13 wherein said vehicle includes an effectively gas-impermeable compartment in which said at least one high-strength porous carbon member is enclosed, and wherein said assembly additionally includes at least one closeable passage operative selectively to provide gas flow communication between the exterior and the interior of said compartment, said compartment thereby being constructed for the containment and discharge of a gas within and from pores of said at least one carbon member.

21. The assembly of claim 15 wherein said vehicle includes a compartment which contains a plurality of said carbon members, at least two of said carbon members being of generally planar form and having mutually confronting surfaces spaced from one another; said assembly additionally including an electrolyte disposed in the space defined between said mutually confronting surfaces of said at least two carbon members, and an electrical current collector on each of said at least two carbon members, said at least two carbon members and said electrolyte comprising an electrical circuit component.

22. The assembly of claim 21 wherein said electrical circuit component is functional to store electric energy.

23. The assembly of claim 21 wherein said electrical circuit component is functional to provide effective capacitance.

24. The assembly of claim 21 wherein each of said at least two carbon members has a generally conformal metallic deposit thereon disposed beneath said electrical current collector thereof.

25. The assembly of claim 21 wherein the space between said mutually confronting surfaces is about 0.001 to 5 millimeters thick.

* * * * *